(12) United States Patent
Furuta

(10) Patent No.: US 9,924,070 B2
(45) Date of Patent: Mar. 20, 2018

(54) CORRECTION METHOD FOR IMAGE FORMING APPARATUS

(71) Applicant: CANON KABUSHIKI KAISHA, Tokyo (JP)

(72) Inventor: Yasutomo Furuta, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/210,380

(22) Filed: Jul. 14, 2016

(65) Prior Publication Data

US 2017/0019561 A1    Jan. 19, 2017

(30) Foreign Application Priority Data

Jul. 16, 2015  (JP) .................................. 2015-141774

(51) Int. Cl.
| | | |
|---|---|---|
| *H04N 1/405* | (2006.01) | |
| *H04N 1/113* | (2006.01) | |
| *H04N 1/06* | (2006.01) | |
| *G03G 15/043* | (2006.01) | |
| *H04N 1/50* | (2006.01) | |

(52) U.S. Cl.
CPC ......... *H04N 1/4052* (2013.01); *G03G 15/043* (2013.01); *H04N 1/06* (2013.01); *H04N 1/113* (2013.01); *H04N 1/506* (2013.01); *H04N 2201/0094* (2013.01)

(58) Field of Classification Search
None
See application file for complete search history.

(56) References Cited

U.S. PATENT DOCUMENTS 5,966,231 A * 10/1999 Bush .................... G02B 26/123
                                                    347/233
6,122,441 A *  9/2000 Tsuji ....................... H04N 1/60
                                                      358/1.9
(Continued)

FOREIGN PATENT DOCUMENTS

JP          2012-098622          5/2012

OTHER PUBLICATIONS

U.S. Appl. No. 15/210,365, filed Jul. 14, 2016.
(Continued)

*Primary Examiner* — Madelein Nguyen
(74) *Attorney, Agent, or Firm* — Fitzpatrick, Cella, Harper & Scinto

(57) ABSTRACT

A correction method for an image forming apparatus including: a light source including light emitting points, a photosensitive member configured to rotate in a first direction, and a deflecting unit configured to deflect light beam emitted from the light source in a second direction orthogonal to the first direction to form scanning lines, the correction method including a correction step of correcting sparseness and denseness of density in the first direction caused by deviation of the scanning lines by moving a predetermined pixel in the first direction in accordance with the deviation, and causing a pixel value of the predetermined pixel to be output in accordance with movement of the predetermined pixel, wherein the correction step corrects the sparseness and denseness of the density based on the deviation of the scanning lines and the pixel value of the pixel, which are adjusted in accordance with an image forming condition.

19 Claims, 20 Drawing Sheets

(56) References Cited

U.S. PATENT DOCUMENTS

| | | | | |
|---|---|---|---|---|
| 6,226,108 B1* | 5/2001 | Toyohara | H04N 1/4078 | 358/504 |
| 6,259,811 B1* | 7/2001 | Tsuji | H04N 1/6058 | 358/518 |
| 8,837,011 B2* | 9/2014 | Takikawa | G03G 15/043 | 347/233 |
| 8,916,418 B2* | 12/2014 | Ishii | B41J 2/45 | 347/130 |
| 8,917,305 B2 | 12/2014 | Nakahata et al. | G03G 15/0415 | |
| 9,261,809 B2 | 2/2016 | Furuta | G03G 15/04072 | |
| 9,285,702 B2* | 3/2016 | Nakagawa | G03G 15/043 | |
| 9,665,031 B2* | 5/2017 | Nagasaki | G03G 15/043 | |
| 2001/0012110 A1* | 8/2001 | Kanamori | H04N 1/4078 | 358/1.9 |
| 2003/0052959 A1* | 3/2003 | Fujimoto | G02B 26/123 | 347/116 |
| 2003/0137576 A1* | 7/2003 | Miho | B41J 2/471 | 347/129 |
| 2003/0174364 A1* | 9/2003 | Goto | H04N 1/387 | 358/3.26 |
| 2003/0193536 A1* | 10/2003 | Kuronuma | H04N 1/047 | 347/9 |
| 2006/0268023 A1* | 11/2006 | Toyama | G03G 15/0409 | 347/2 |
| 2007/0273899 A1* | 11/2007 | Yazawa | B41J 2/2132 | 358/1.8 |
| 2008/0068677 A1* | 3/2008 | Sakamoto | G06K 15/1219 | 358/480 |
| 2009/0296763 A1* | 12/2009 | Inukai | B41J 2/442 | 372/38.02 |
| 2010/0060938 A1* | 3/2010 | Kondoh | G03G 15/161 | 358/3.13 |
| 2010/0238258 A1* | 9/2010 | Shoji | B41J 2/473 | 347/224 |
| 2011/0058831 A1* | 3/2011 | Usami | G03G 15/1645 | 399/46 |
| 2011/0181679 A1* | 7/2011 | Arai | G02B 26/123 | 347/224 |
| 2011/0228286 A1* | 9/2011 | Kaima | G06K 15/128 | 358/1.2 |
| 2013/0044347 A1* | 2/2013 | Kitai | H04N 1/4092 | 358/1.14 |
| 2013/0229696 A1* | 9/2013 | Takikawa | G03G 15/043 | 358/474 |
| 2013/0242315 A1* | 9/2013 | Shimahashi | G03G 15/043 | 358/1.1 |
| 2013/0286143 A1* | 10/2013 | Nakahata | G03G 15/0415 | 347/224 |
| 2014/0185024 A1* | 7/2014 | Zellner | G03F 7/70891 | 355/30 |
| 2014/0333940 A1* | 11/2014 | Iwata | G03G 15/043 | 358/1.1 |
| 2015/0277324 A1* | 10/2015 | Goto | G03G 15/043 | 399/72 |
| 2015/0338762 A1* | 11/2015 | Nakagawa | G03G 15/043 | 399/51 |
| 2016/0070195 A1* | 3/2016 | Tachibana | G03G 15/043 | 347/118 |
| 2016/0147170 A1 | 5/2016 | Furuta | G03G 15/043 | |
| 2016/0246208 A1* | 8/2016 | Nagasaki | H04N 1/387 | |
| 2016/0274481 A1* | 9/2016 | Kawanabe | G03G 15/043 | |
| 2016/0347083 A1* | 12/2016 | Ishidate | G03G 15/04036 | |
| 2017/0019560 A1* | 1/2017 | Horiuchi | H04N 1/4052 | |
| 2017/0019561 A1* | 1/2017 | Furuta | H04N 1/4052 | |
| 2017/0019562 A1* | 1/2017 | Furuta | H04N 1/4052 | |
| 2017/0019563 A1* | 1/2017 | Araki | H04N 1/4052 | |
| 2017/0019564 A1* | 1/2017 | Horiuchi | H04N 1/4052 | |
| 2017/0038703 A1* | 2/2017 | Horiuchi | G03G 15/043 | |
| 2017/0041489 A1* | 2/2017 | Furuta | G03G 15/04072 | |
| 2017/0280001 A1* | 9/2017 | Furuta | H04N 1/2346 | |

OTHER PUBLICATIONS

U.S. Appl. No. 15/210,389, filed Jul. 14, 2016.
U.S. Appl. No. 15/210,394, filed Jul. 14, 2016.
U.S. Appl. No. 15/210,402, filed Jul. 14, 2016.
U.S. Appl. No. 15/222,692, filed Jul. 28, 2016.
U.S. Appl. No. 15/222,687, filed Jul. 28, 2016.

* cited by examiner

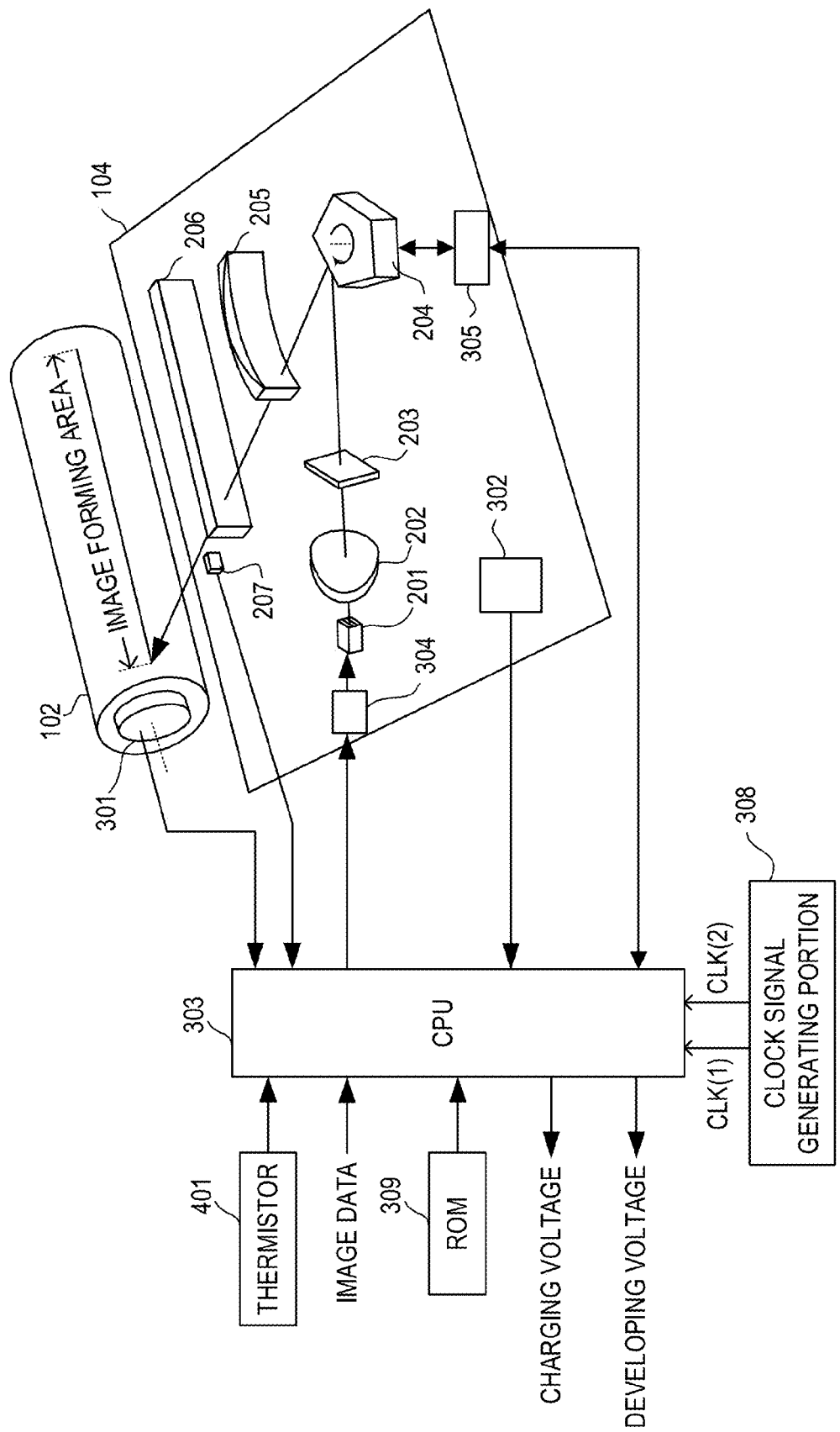

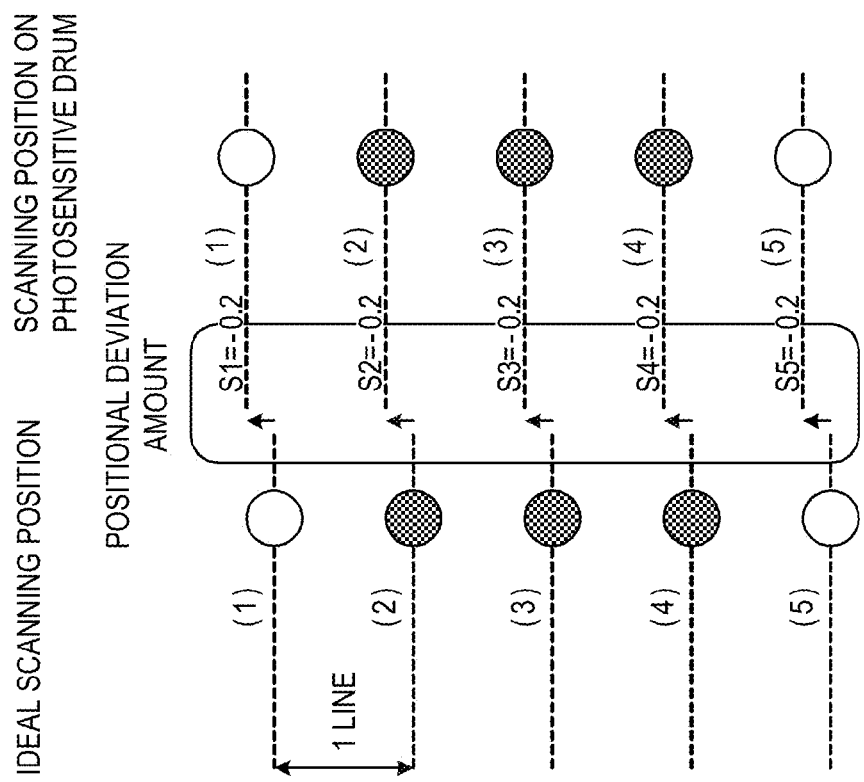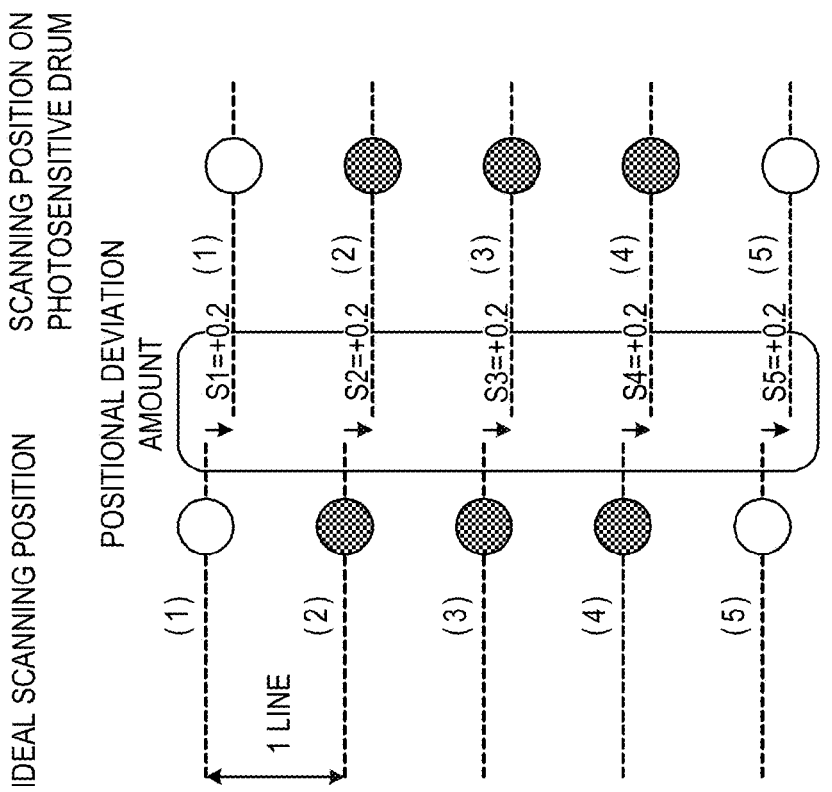

SCANNING POSITIONS ARE DENSE

SCANNING POSITIONS ARE SPARSE

SCANNING POSITIONS ARE SHIFTED IN ADVANCE DIRECTION

SCANNING POSITIONS ARE SHIFTED IN RETURN DIRECTION

SCANNING POSITIONS ARE DENSE

SCANNING POSITIONS ARE SPARSE

SCANNING POSITIONS ARE DENSE

SCANNING POSITIONS ARE SPARSE

CURVE CHARACTERISTIC OF LIGHT INTENSITY vs DENSITY

FIG. 16A

IMAGE DATA IN B

| 15 | 15 | 15 | 15 | 15 | 15 | 15 | 15 |
|----|----|----|----|----|----|----|----|
| 15 | 15 | 15 | 15 | 15 | 15 | 15 | 15 |
|    |    |    |    |    |    |    |    |
| 15 | 15 | 15 | 15 | 15 | 15 | 15 | 15 |
| 15 | 15 | 15 | 15 | 15 | 15 | 15 | 15 |
|    |    |    |    |    |    |    |    |

FIG. 16B

IMAGE DATA IN A

| 13 | 13 | 13 | 13 | 13 | 13 | 13 | 13 |
|----|----|----|----|----|----|----|----|
| 15 | 15 | 15 | 15 | 15 | 15 | 15 | 15 |
| 2  | 2  | 2  | 2  | 2  | 2  | 2  | 2  |
| 13 | 13 | 13 | 13 | 13 | 13 | 13 | 13 |
| 15 | 15 | 15 | 15 | 15 | 15 | 15 | 15 |
| 2  | 2  | 2  | 2  | 2  | 2  | 2  | 2  |

FIG. 16C

A: MOVED BY 1/8 PIXEL

IMAGE DATA IN A

| 13 | 13 | 13 | 13 | 13 | 13 | 13 | 13 |
|----|----|----|----|----|----|----|----|
| 15 | 15 | 15 | 15 | 15 | 15 | 15 | 15 |
| 2  | 2  | 2  | 2  | 2  | 2  | 2  | 2  |
| 13 | 13 | 13 | 13 | 13 | 13 | 13 | 13 |
| 15 | 15 | 15 | 15 | 15 | 15 | 15 | 15 |
| 2  | 2  | 2  | 2  | 2  | 2  | 2  | 2  |

B: LIGHT INTENSITY WITHOUT PIXEL MOVEMENT

IMAGE DATA IN B

| 15 | 15 | 15 | 15 | 15 | 15 | 15 | 15 |
|----|----|----|----|----|----|----|----|
| 15 | 15 | 15 | 15 | 15 | 15 | 15 | 15 |
|    |    |    |    |    |    |    |    |
| 15 | 15 | 15 | 15 | 15 | 15 | 15 | 15 |
| 15 | 15 | 15 | 15 | 15 | 15 | 15 | 15 |
|    |    |    |    |    |    |    |    |

FIG. 17

|      | 0 | 1 | 2 | 3 | 4 | 5 | 6 | 7 | 8 | 9 | 10 | 11 | 12 | 13 | 14 | 15 |
|------|---|---|---|---|---|---|---|---|---|---|----|----|----|----|----|----|
| 0000 | 0 | 0 | 0 | 0 | 0 | 0 | 0 | 0 | 0 | 0 | 0  | 0  | 0  | 0  | 0  | 0  |
| 0001 | 0 | 0 | 0 | 0 | 0 | 0 | 0 | 0 | 0 | 0 | 0  | 0  | 0  | 0  | 1  | 1  |
| 0010 | 0 | 0 | 0 | 0 | 0 | 0 | 0 | 0 | 0 | 0 | 0  | 0  | 0  | 1  | 1  | 1  |
| 0011 | 0 | 0 | 0 | 0 | 0 | 0 | 0 | 0 | 0 | 0 | 0  | 1  | 1  | 1  | 1  | 1  |
| 0100 | 0 | 0 | 0 | 0 | 0 | 0 | 0 | 0 | 0 | 0 | 0  | 1  | 1  | 1  | 1  | 1  |
| 0101 | 0 | 0 | 0 | 0 | 0 | 0 | 0 | 0 | 0 | 0 | 1  | 1  | 1  | 1  | 1  | 1  |
| 0110 | 0 | 0 | 0 | 0 | 0 | 0 | 0 | 0 | 0 | 1 | 1  | 1  | 1  | 1  | 1  | 1  |
| 0111 | 0 | 0 | 0 | 0 | 0 | 0 | 0 | 0 | 1 | 1 | 1  | 1  | 1  | 1  | 1  | 1  |
| 1000 | 0 | 0 | 0 | 0 | 0 | 0 | 0 | 1 | 1 | 1 | 1  | 1  | 1  | 1  | 1  | 1  |
| 1001 | 0 | 0 | 0 | 0 | 0 | 0 | 1 | 1 | 1 | 1 | 1  | 1  | 1  | 1  | 1  | 1  |
| 1010 | 0 | 0 | 0 | 0 | 0 | 1 | 1 | 1 | 1 | 1 | 1  | 1  | 1  | 1  | 1  | 1  |
| 1011 | 0 | 0 | 0 | 0 | 1 | 1 | 1 | 1 | 1 | 1 | 1  | 1  | 1  | 1  | 1  | 1  |
| 1100 | 0 | 0 | 0 | 1 | 1 | 1 | 1 | 1 | 1 | 1 | 1  | 1  | 1  | 1  | 1  | 1  |
| 1101 | 0 | 0 | 1 | 1 | 1 | 1 | 1 | 1 | 1 | 1 | 1  | 1  | 1  | 1  | 1  | 1  |
| 1110 | 0 | 1 | 1 | 1 | 1 | 1 | 1 | 1 | 1 | 1 | 1  | 1  | 1  | 1  | 1  | 1  |
| 1111 | 1 | 1 | 1 | 1 | 1 | 1 | 1 | 1 | 1 | 1 | 1  | 1  | 1  | 1  | 1  | 1  |

CORRECTION METHOD FOR IMAGE FORMING APPARATUS

BACKGROUND OF THE INVENTION

Field of the Invention

The present invention relates to a correction method for an image forming apparatus, for correcting distortion and uneven image density of an image during image formation of a two-dimensional image by the image forming apparatus, e.g., a digital copying machine, a multifunctional peripheral, or a laser printer.

Description of the Related Art

In electrophotographic image forming apparatus such as a laser printer and a copying machine, there has been generally known a configuration to form a latent image on a photosensitive member with use of a light scanning device configured to perform scanning with a laser beam. In the light scanning device of a laser scanning type, a laser beam collimated with use of a collimator lens is deflected by a rotary polygon mirror, and the deflected laser beam is formed into an image on a photosensitive member with use of an elongated fθ lens. Further, there is known multibeam scanning in which a laser light source having a plurality of light emitting points is included in one package so as to perform scanning with a plurality of laser beams simultaneously.

Meanwhile, in order to form a satisfactory image without uneven image density and banding (stripe pattern caused by the difference in image density), it is desired that distances between scanning lines of which positions to be scanned with a laser beam are adjacent to each other in a rotational direction of the photosensitive member be equal to each other. However, the distances between the scanning lines are varied due to a plurality of factors described below. The distances between the scanning lines on the photosensitive member are varied by, for example, a fluctuation in a surface speed of the photosensitive member, or a rotation speed fluctuation of a rotary polygon mirror. Further, the distances between the scanning lines are also varied by a variation in angle of mirror faces of the rotary polygon mirror with respect to a rotary shaft of the rotary polygon mirror and a variation in intervals between light emitting points arranged on a laser light source. To cope with uneven image density and banding caused by such factors, there has been proposed a technology of correcting banding by controlling an exposure amount of the light scanning device. For example, in Japanese Patent Application Laid-Open No. 2012-98622, there is described a configuration in which a beam position detection unit configured to detect a beam position in a sub-scanning direction is arranged in the vicinity of the photosensitive member, and the exposure amount of the light scanning device is adjusted based on scanning distance information obtained from a detected beam position, to thereby make banding less noticeable.

Similarly to Japanese Patent Application Laid-Open No. 2012-98622 described above, as a configuration to make banding less noticeable by controlling an exposure amount, there is given a configuration to correct the positions of scanning lines by shifting image data in the sub-scanning direction in accordance with position information in the sub-scanning direction of each scanning line. In an electrophotographic image forming apparatus, banding is caused also by image positional deviation of from about 2 μm to about 5 μm. For example, in an image forming apparatus having a resolution of 1,200 dpi, the width of one pixel is 21.16 μm, and hence in order to correct the image positional deviation of from about 2 μm to about 5 μm, it is necessary to move an image gravity center with a resolution of ¹/₁₀ pixel or less. Meanwhile, when the image gravity center is moved by shifting (adding) image data, the movement amount of the image gravity center with respect to the image data to be added may be varied depending on the photosensitive member and the developing process conditions.

In FIG. 15A, exposure distributions (exposure areas) of two adjacent scanning lines overlap each other to form a composite light spot B in which light spots in the two scanning lines are added to each other. In FIG. 15B, the exposure amount of the first scanning line is decreased, and a pixel in the third scanning line is newly exposed to light in a small exposure amount. With this, a composite light spot A, in which light spots in the three scanning lines are combined, is formed, and it is understood that, as compared to the composite light spot B of FIG. 15A, the image gravity center of the composite light spot A is moved in the rightward direction of FIG. 15B. FIG. 15C and FIG. 15D are each a graph for showing a comparison of exposure widths and exposure positions obtained by slicing the composite light spots A and B with developing threshold values Th1 and Th2. As shown in FIG. 15C, when the composite light spots A and B are sliced with the developing threshold value Th1, the exposure positions of the composite light spots A and B are slightly shifted from each other, but the exposure widths thereof are substantially the same. Meanwhile, as shown in FIG. 15D, when the composite light spots A and B are sliced with the developing threshold value Th2, the exposure width of the composite light spot A becomes slightly thicker (wider) as compared to that of the composite light spot B, and the movement amount of the exposure position in the rightward direction of the composite light spot A also becomes larger. Further, as is understood from FIG. 16B, when a developing threshold value changes significantly at a time when banding correction is performed, the image density decreases in an image area A in which the image gravity center is moved as compared to that of an image area B in which the image gravity center is not moved, and a density change occurs. The details of FIG. 15A to FIG. 15D, and FIG. 16A to FIG. 16C will be described later.

As described above, in the case of performing processing of shifting image data by adding image data, there is a problem in that the movement amount also changes due to a change in developing threshold value, and hence banding correction cannot be performed satisfactorily. Such change in developing threshold value is liable to occur due to a change in image forming conditions, such as a charging amount for charging a photosensitive member, a developing voltage applied between a photosensitive member and a developing device, and an exposure light intensity.

SUMMARY OF THE INVENTION

The present invention has been made under the above-mentioned circumstances, and it is an object of the present invention to obtain satisfactory image quality by correcting uneven image density of an image, which occurs in a direction corresponding to a rotational direction of a photosensitive member, in accordance with image forming conditions.

According to one embodiment of the present invention, there is provided a correction method for an image forming apparatus, the image forming apparatus comprising:
a light source comprising a plurality of light emitting points;
a photosensitive member configured to rotate in a first direction so that a latent image is formed on the photosensitive member with a light beam emitted from the light source; and
a deflecting unit configured to deflect the light beam emitted from the light source to move light spots of the light beam radiated to the photosensitive member in a second direction orthogonal to the first direction to form scanning lines,
the correction method comprising a correction step of correcting sparseness and denseness of density in the first direction caused by deviation of the scanning lines in the first direction by moving a predetermined pixel in the first direction in accordance with the deviation of the scanning lines, and causing a pixel value of the predetermined pixel to be output in accordance with a movement of the predetermined pixel,
wherein the correction step comprises correcting the sparseness and denseness of the density based on the deviation of the scanning lines and the pixel value of the pixel, which are adjusted in accordance with an image forming condition.

Further features of the present invention will become apparent from the following description of exemplary embodiments with reference to the attached drawings.

BRIEF DESCRIPTION OF THE DRAWINGS

FIG. 1B is a view for illustrating a configuration of the periphery of a photosensitive drum and a light scanning device.

FIG. 8A, FIG. 8B, FIG. 8C, and FIG. 8D are each a diagram for illustrating positional deviation of pixels for each classification according to the first and second embodiments.

FIG. 16A, FIG. 16B, and FIG. 16C are each a table for showing uneven image density caused by the movement of the image gravity center in the conventional art.

FIG. 17 is a diagram for showing a conversion table for converting image data (density data) into drive data for generating a PWM signal.

DESCRIPTION OF THE EMBODIMENTS

First, prior to embodiments described later, problems in the conventional banding correction will be described in detail with reference to FIG. 15A to FIG. 15D and FIG. 16A to FIG. 16C. As described above, as a configuration to make banding less noticeable by controlling an exposure amount, there is a configuration to correct the positions of scanning lines by shifting image data in a sub-scanning direction in accordance with position information in the sub-scanning direction of each scanning line. In an electrophotographic image forming apparatus, banding is caused also by image positional deviation of from about 2 μm to about 5 μm. For example, in an image forming apparatus having a resolution of 1,200 dpi, the width of one pixel is 21.16 μm, and hence in order to correct the image positional deviation of from about 2 μm to about 5 μm, it is necessary to move an image gravity center with a resolution of 1/10 pixel or less. Meanwhile, when the image gravity center is moved by adding image data as described above in the electrophotographic image forming apparatus, the movement amount of the image gravity center with respect to the image data to be added may be varied depending on the photosensitive member and the developing process conditions.

Figure 15A:
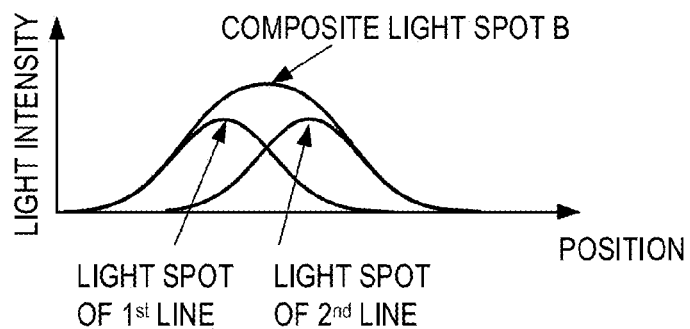
FIG. 15A, FIG. 15B, FIG. 15C, and FIG. 15D are each a graph for showing the movement of an image gravity center in the conventional art.
Figure 15B:
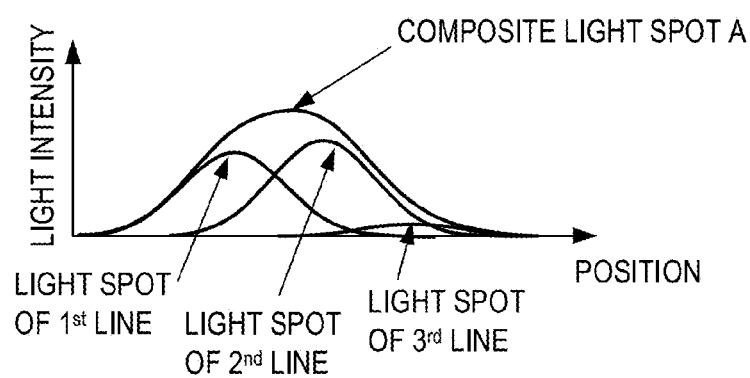

FIG. 15A is a graph for showing an exposure distribution cross-section in the sub-scanning direction in a state in which a light beam is lit at pixels in two adjacent scanning lines (hereinafter simply referred to as "pixels are turned on"). The vertical axis of FIG. 15A represents a light intensity, and the horizontal axis represents a position in the sub-scanning direction, which also similarly applies to FIG. 15B. In FIG. 15A, there is shown an exposure distribution formed by a light scanning device in which a light spot of a light beam has a diameter of 70 μm (light spot size) with a resolution of 1,200 dpi. In the case of a resolution of 1,200 dpi, the size (width) of one pixel is 21.16 μm, and hence the light spot size of 70 μm is larger than an interval of pixels. Therefore, when the two scanning lines are turned on, exposure distributions (exposure areas) of the respective scanning lines overlap each other to form a composite light spot B in which light spots in the two scanning lines are added to each other. In FIG. 15B, as compared to the composite light spot B shown in FIG. 15A, there is shown an example in which the exposure amount of the first scanning line is decreased, and a pixel in the third scanning line is newly exposed to light in a small exposure amount. In FIG. 15B, the third scanning line is exposed to light in a small exposure amount, to thereby form a composite light spot A in which light spots in the three scanning lines are combined. It is understood that the image gravity center of the composite light spot A is moved in the rightward direction of FIG. 15B as compared to the composite light spot B of FIG. 15A. As described above, through addition of the scanning lines exposed to light in a small exposure amount, the image gravity center of an image spot to be formed can be moved.

Figure 15C:
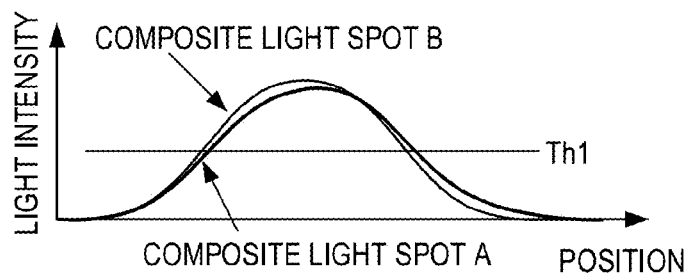
Figure 15D:
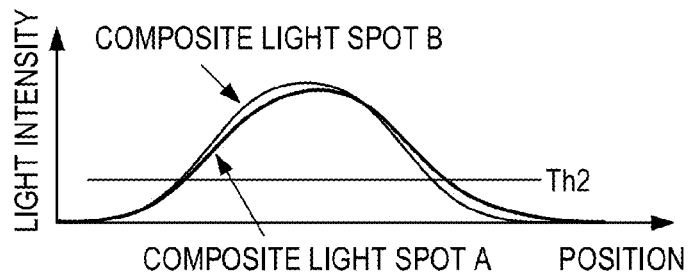

Further, FIG. 15C and FIG. 15D are each a graph for showing a comparison of the composite light spots A and B. Each vertical axis represents a light intensity, and each horizontal axis represents a position in the sub-scanning direction. Th1 of FIG. 15C and Th2 of FIG. 15D each schematically represents a threshold value, at which development is performed through adhesion of a toner, with respect to an exposure distribution, and the threshold value is hereinafter referred to as a developing threshold value. Further, the developing threshold values Th1 and Th2 have a magnitude relationship of Th1>Th2. In the composite light spots A and B shown in FIG. 15C and FIG. 15D, a portion exposed to light at a light intensity of the developing threshold values Th1 and Th2 or more are developed with a toner, and a portion exposed to light at a light intensity of less than the developing threshold values Th1 and Th2 is not developed with a toner. In FIG. 15C and FIG. 15D, the exposure position of the composite light spot A indicated by the thick solid line is moved in the rightward direction of FIG. 15C and FIG. 15D relative to the composite light spot B indicated by the thin solid line. Further, the exposure distribution of the composite light spot A slightly changes as compared to that of the composite light spot B, and hence the peak exposure amount of the composite light spot A is slightly decreased as compared to that of the composite light spot B. In comparison of exposure widths and exposure positions obtained by slicing the composite light spots A and B with the developing threshold values Th1 and Th2, when the composite light spots A and B are sliced with the developing threshold value Th1 (FIG. 15C), the exposure positions of the composite light spots A and B are slightly shifted from each other, but the exposure widths thereof are substantially the same. Meanwhile, when the composite light spots A and B are sliced with the developing threshold value Th2 (FIG. 15D), the exposure width of the composite light spot A becomes slightly thicker (wider) as compared to that of the composite light spot B, and the movement amount of the exposure position in the rightward direction of the composite light spot A also becomes larger. As described above, in the case of performing processing of shifting image data by adding image data, there is a problem in that the movement amount also changes due to a change in developing threshold value, and hence banding correction cannot be performed satisfactorily. Such change in developing threshold value is liable to occur due to a change in image forming conditions, such as a charging amount for charging a photosensitive drum, a developing voltage applied between a photosensitive drum and a developing device, and an exposure light intensity.

Next, an example in which an image shift is performed will be described. FIG. 16A and FIG. 16B are each a table for showing image data to be printed on a recording material. In each table, the vertical direction represents a printing line in a length direction (sub-scanning direction) of a recording material, and the horizontal direction represents pixels in a width direction (main scanning direction) in each printing line of the recording material. The numerical values in the table represent image data of each pixel (density value displayed in 16 levels of from 0 to 15). In FIG. 16A and FIG. 16B, there is shown an example in which an image gravity center is moved downward in the length direction by reducing, relative to the image data of FIG. 16A, the image data (density value) in the second and sixth lines by 2 and adding the reduced image data (density value) to the fourth and eighth lines by 2 as shown in the table of FIG. 16B. With this, the image gravity center is moved toward the third line by ⅛ pixel (=2/16). In the configuration, the movement amount of the image gravity center can be adjusted by a data value of image data to be added. That is, when the data value of the image data to be added is small, a pixel to be exposed in a small exposure amount is added, and the image gravity center is moved by a small amount. Meanwhile, when the data value of the image data to be added is large, a pixel to be exposed to light in a large exposure amount is added, and the image gravity center is moved by a large amount. In FIG. 16C, there is shown a state in which density is changed due to a large change in developing threshold value when banding correction is performed with the above-mentioned image data shown in FIG. 16A and FIG. 16B. In the image area A, the image gravity center is moved downward in the length direction through banding correction. Meanwhile, in the image area B, the image gravity center is not moved because the pixel position is located at an ideal position. As a result, as shown in FIG. 16C, it is understood that the image density is decreased in the image area A as compared to that of the image area B, and a density change occurs.

As described above, in the case of performing processing of shifting image data by adding image data, there is a problem in that the movement amount also changes due to a change in developing threshold value, and hence banding correction cannot be performed satisfactorily. Such change in developing threshold value is liable to occur due to a change in image forming conditions (e.g., a charging voltage for charging a photosensitive drum, a developing voltage applied between a photosensitive drum and a developing device, and an exposure light intensity from a light scanning device). The embodiments of the present invention will be described in detail below in an illustrative manner with reference to the drawings. A direction of an axis of rotation of a photosensitive drum, which is a direction in which scanning is performed with a laser beam, is defined as a main scanning direction which is a second direction, and a rotational direction of the photosensitive drum, which is a direction substantially orthogonal to the main scanning direction, is defined as a sub-scanning direction which is a first direction.

First Embodiment

<Overall Configuration of Image Forming Apparatus>

Figure 1A:
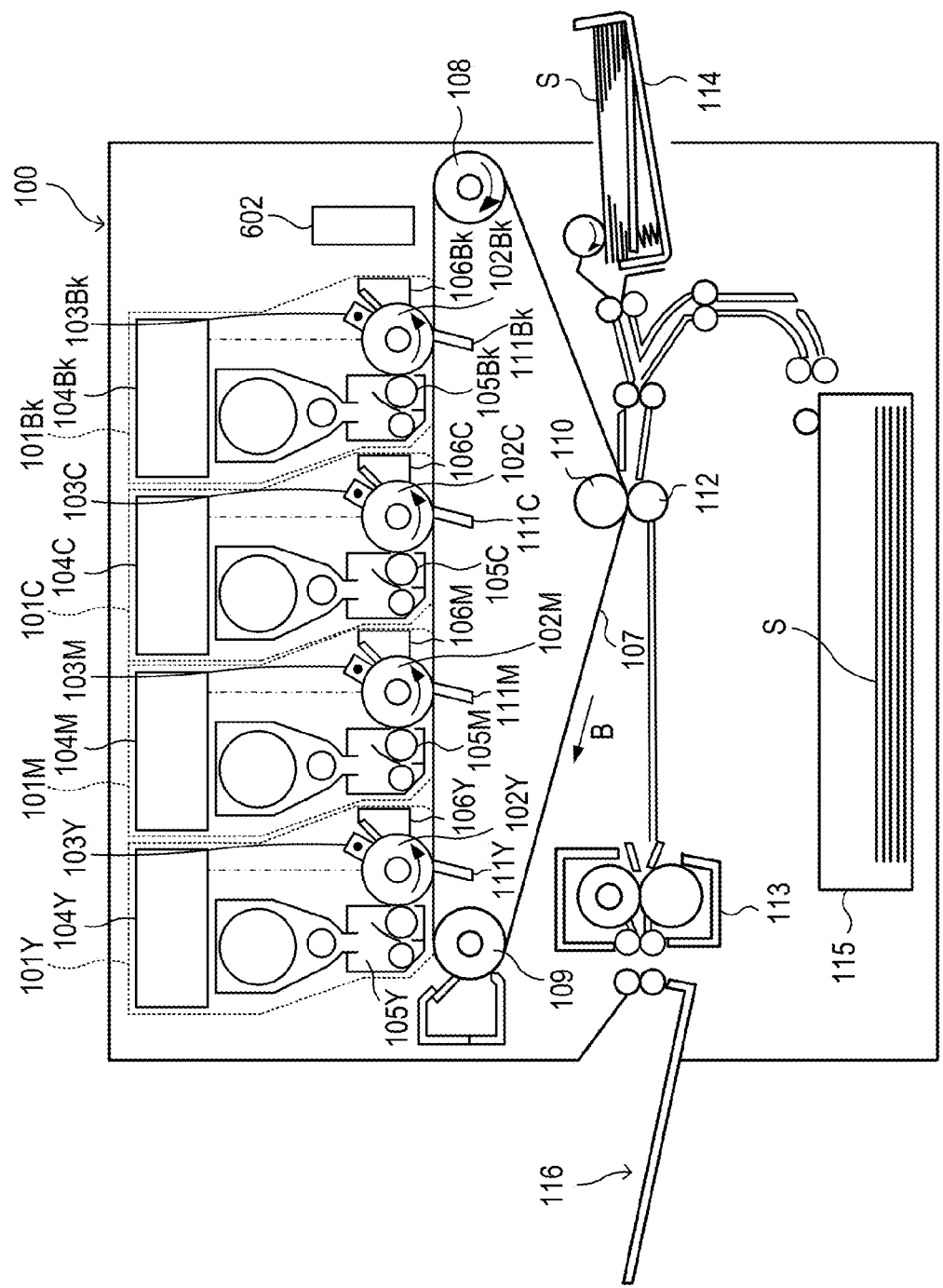
FIG. 1A is a view for illustrating an entire image forming apparatus according to first and second embodiments.

FIG. 1A is a schematic cross-sectional view of a digital full-color printer (color image forming apparatus) configured to perform image formation by using toners of a plurality of colors. An image forming apparatus 100 according to a first embodiment will be described with reference to FIG. 1A. The image forming apparatus 100 includes four image forming portions (image forming units) 101Y, 101M, 101C, and 101Bk (broken line portions) respectively configured to form images of different colors. The image forming portions 101Y, 101M, 101C, and 101Bk form images by using toners of yellow, magenta, cyan, and black, respectively. Reference symbols Y, M, C, and Bk denote yellow, magenta, cyan, and black, respectively, and suffixes Y, M, C, and Bk are omitted in the description below unless a particular color is described.

The image forming portions 101 each include a photosensitive drum 102, being a photosensitive member. A charging device 103, a light scanning device 104, and a developing device 105 are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A while forming an image. Further, primary transfer devices 111 are arranged at positions opposed to the photosensitive drums 102 across the intermediate transfer belt 107 (intermediate transfer member). The image forming apparatus 100 according to the embodiment further includes a secondary transfer device 112 configured to transfer the toner image on the intermediate transfer belt 107 onto a sheet S being a recording medium and a fixing device 113 configured to fix the toner image on the sheet S.

An image forming process from a charging step to a developing step of the image forming apparatus 100 will be described. The image forming process is the same in each of the image forming portions 101, and hence the image forming process will be described with reference to an example of the image forming portion 101Y. Accordingly, descriptions of the image forming processes in the image forming portions 101M, 101C, and 101Bk are omitted. The charging device 103Y of the image forming portion 101Y applies a uniform voltage to the photosensitive drum 102Y, to thereby charge the photosensitive drum 102Y that is driven to rotate in the arrow direction (counterclockwise direction) illustrated in FIG. 1A. The charged photosensitive drum 102Y is exposed by a laser beam emitted from the light scanning device 104Y, which is indicated by the dashed dotted line. With this operation, an electrostatic latent image is formed on the rotating photosensitive drum 102Y (on the photosensitive member). The electrostatic latent image formed on the photosensitive drum 102Y receives toner adhered thereon through application of a developing voltage by the developing device 105Y, and is developed as a toner image of yellow. The same step is performed also in the image forming portions 101M, 101C, and 101Bk.

The image forming process from a transfer step will be described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a delivery portion 116. A density sensor 602 serving as a density detection unit is configured to detect density of a density patch formed on the intermediate transfer belt 107.

<Photosensitive Drum and Light Scanning Device>

FIG. 1B is an illustration of configurations of the photosensitive drum 102, the light scanning device 104, and a controller for the light scanning device 104. The light scanning device 104 includes a laser light source 201, a collimator lens 202, a cylindrical lens 203, and a rotary polygon mirror 204. The laser light source 201 includes a plurality of light emitting points. The plurality of light emitting points are each configured to emit a laser beam (light beam). The collimator lens 202 is configured to collimate the laser beam. The cylindrical lens 203 condenses the laser beam having passed through the collimator lens 202 in a sub-scanning direction. In the embodiment, the laser light source 201 is described by exemplifying a light source in which a plurality of light emitting points are arranged, but is similarly operated also in the case of using a single light source. The laser light source 201 is driven by a laser drive circuit 304. The rotary polygon mirror 204 is formed of a motor portion configured to be operated to rotate and a reflection mirror mounted on a motor shaft. A face of the reflection mirror of the rotary polygon mirror 204 is hereinafter referred to as "mirror face". The rotary polygon mirror 204 is driven by a mirror drive portion 305. The light scanning device 104 includes fθ lenses 205 and 206 configured to receive a laser beam (scanning light) deflected by the rotary polygon mirror 204. Further, the light scanning device 104 includes a memory (storage unit) 302 configured to store various pieces of information.

Further, the light scanning device 104 includes a beam detector 207 (hereinafter referred to as "BD 207") that is a signal generating unit configured to detect the laser beam deflected by the rotary polygon mirror 204 and output a horizontal synchronization signal (hereinafter referred to as "BD signal") in accordance with the detection of the laser beam. The laser beam output from the light scanning device 104 scans the photosensitive drum 102. The scanning direction of the laser beam is substantially parallel to the rotary shaft of the photosensitive drum 102. Every time the mirror face of the rotary polygon mirror 204 scans the photosensitive drum 102, the light scanning device 104 causes a laser beam emitted from the laser light source to scan the photosensitive drum 102 in the main scanning direction, to thereby form scanning lines corresponding to the number of laser elements simultaneously. In the embodiment, a configuration is described in which the rotary polygon mirror 204 has five mirror faces, and the laser light source 201 includes eight laser elements, as an example. That is, in the embodiment, an image of eight lines is formed with one scanning, and the rotary polygon mirror 204 scans the photosensitive drum 102 five times per revolution of the rotary polygon mirror 204, to thereby form an image of forty lines in total.

The photosensitive drum 102 includes a rotary encoder 301 serving as a speed detection unit on the rotary shaft, and the rotation speed of the photosensitive drum 102 is detected with use of the rotary encoder 301. The rotary encoder 301 generates 1,000 pulses per revolution of the photosensitive drum 102, and outputs information on the rotation speed (rotation speed data) of the photosensitive drum 102 based on the results obtained by measuring a time interval between the generated pulses with use of a built-in timer to a CPU 303. A known speed detection technology other than the above-mentioned rotary encoder 301 may be used as long as the rotation speed of the photosensitive drum 102 can be detected. As a method other than the use of the rotary encoder 301, there is given, for example, a configuration to detect the surface speed of the photosensitive drum 102 with a laser Doppler.

Further, the image forming apparatus 100 includes a thermistor 401 serving as a temperature detection unit configured to detect an internal temperature of the image forming apparatus 100, and the CPU 303 receives a temperature detection signal from the thermistor 401. The CPU 303 is configured to control the image forming conditions in accordance with the temperature in the image forming apparatus 100 detected by the thermistor 401 so that image density reaches predetermined density in advance. In the embodiment, the image forming conditions refer to a charging voltage of the charging device 103 configured to charge the photosensitive drum 102 and a developing voltage applied by the developing device 105 so as to develop an electrostatic latent image on the photosensitive drum 102. Further, in the embodiment, the image forming condition refers to an exposure light intensity from the light scanning device 104 configured to form an electrostatic latent image on the photosensitive drum 102. An example of controlling the image forming condition with use of a developing voltage will be described below. The CPU 303 is configured to finely adjust the image forming conditions to adjust the image density with high accuracy based on the density detection results of a patch formed on the intermediate transfer belt 107 detected by the density sensor 602. Further, the CPU 303 also finely adjusts an exposure amount based on the density detection value of the patch detected by the density sensor 602.

The charging device 103 is configured to apply a charging voltage to the photosensitive drum 102 with an output voltage from a charging voltage drive circuit (not shown). The CPU 303 is configured to set a value of voltage to be output to the charging device 103, with respect to the charging voltage drive circuit. Similarly, the developing device 105 also applies a developing voltage to the photosensitive drum 102 with an output voltage from a developing voltage drive circuit (not shown). The CPU 303 is configured to set a value of voltage to be output to the developing device 105, with respect to the developing voltage drive circuit. Further, the CPU 303 instructs the laser drive circuit 304 on an emission light intensity of the laser light source 201, to thereby adjust an exposure amount with respect to the photosensitive drum 102.

<Function of Controller for Light Scanning Device>

Figure 2:
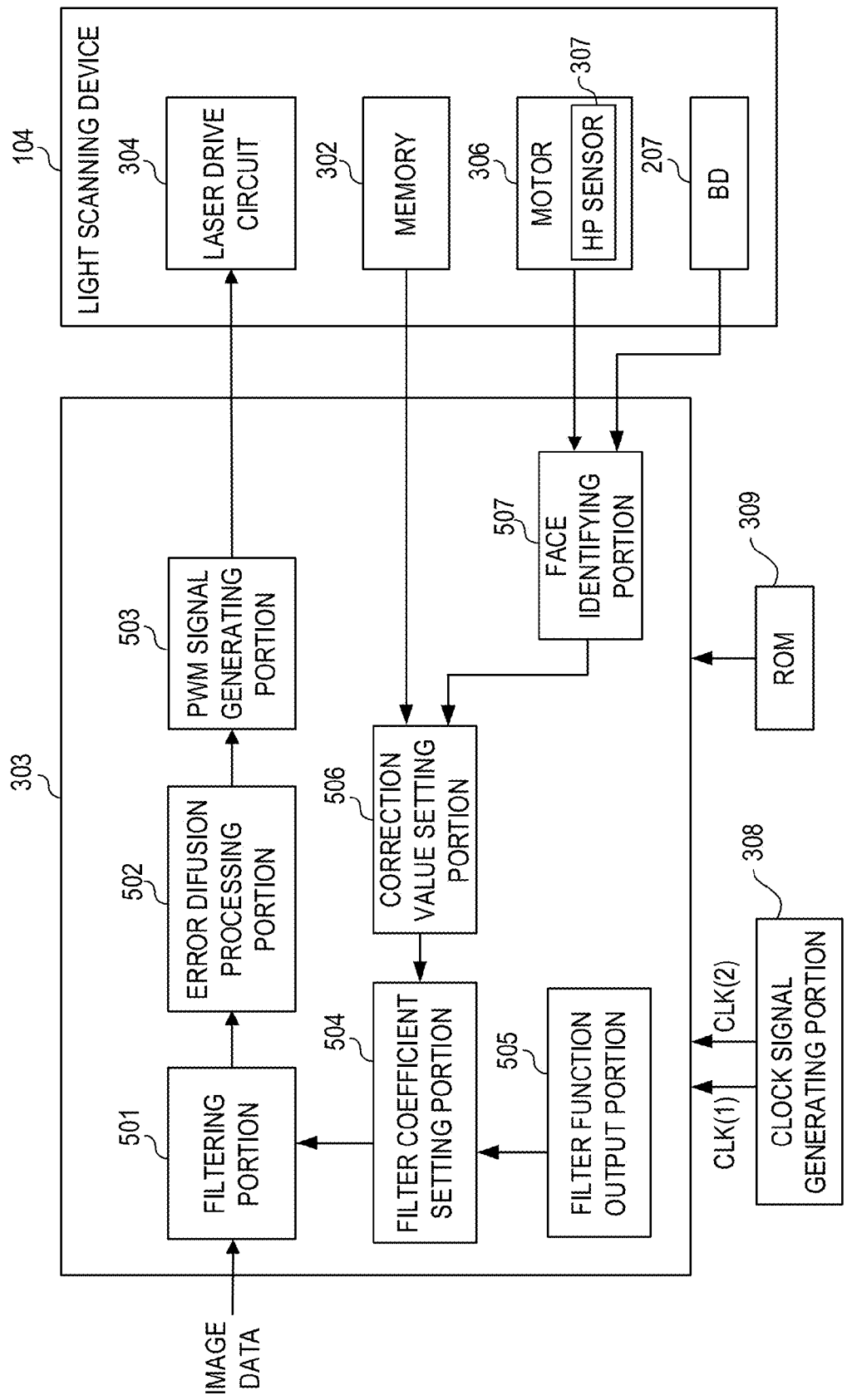
FIG. 2 is a block diagram of the image forming apparatus according to the first and second embodiments.

Next, the CPU 303 serving as the controller for the light scanning device 104 and a clock signal generating portion 308 will be described with reference to FIG. 2. The CPU 303 and the clock signal generating portion 308 are mounted on the image forming apparatus 100. FIG. 2 is a block diagram for illustrating the functions of the CPU 303 configured to execute correction processing of correcting distortion and uneven image density of an image described later. The CPU 303 includes a filtering portion 501, an error diffusion processing portion 502, and a pulse width modulation (PWM) signal generating portion 503. The filtering portion 501 is configured to perform filtering by subjecting input image data to a convolution operation. The error diffusion processing portion 502 is configured to subject the image data after the filtering to error diffusion processing. The PWM signal generating portion 503 is configured to subject the image data (density data) after the error diffusion processing to PWM transformation and output a PWM signal to the laser drive circuit 304 of the light scanning device 104. The clock signal generating portion 308 is configured to output a clock signal CLK(1) and a clock signal CLK(2) to the CPU 303. The clock signal CLK(1) is a clock signal illustrated in FIG. 5 described later. The clock signal CLK(1) is a signal generated by multiplying the clock signal CLK(2). Thus, the clock signal CLK(1) and the clock signal CLK(2) have a synchronization relationship. In the embodiment, the clock signal generating portion 308 outputs the clock signal CLK(1) generated by multiplying the clock signal CLK(2) by 16 to the CPU 303. The clock signal CLK(2) is a signal having a period corresponding to one pixel. The clock signal CLK(1) is a signal having a period corresponding to divided pixels obtained by dividing one pixel by 16.

Further, the CPU 303 includes a filter coefficient setting portion 504, a filter function output portion 505, and a correction value setting portion 506. The filter function output portion 505 is configured to output data on a function to be used for a convolution operation (for example, data in a table) to the filter coefficient setting portion 504. As a function to be used for the convolution operation, there is given, for example, linear interpolation and bicubic interpolation. The correction value setting portion 506 is configured to identify a mirror face which reflects a laser beam from among a plurality of mirror faces based on a face synchronization signal input from a face identifying portion 507. The correction value setting portion 506 is configured to determine a positional deviation amount in the rotation direction of the photosensitive drum 102 of a scanning line formed with a laser beam deflected by the mirror face identified by the face identifying portion 507 described later. The correction value setting portion 506 then calculates a correction value based on the positional deviation amount and outputs the calculated correction value to the filter coefficient setting portion 504. The filter coefficient setting portion 504 is configured to calculate a filter coefficient to be used for the filtering in the filtering portion 501 based on information on the convolution function input from the filter function output portion 505 and the correction value input from the correction value setting portion 506. The filter coefficient setting portion 504 is configured to set the calculated filter coefficient in the filtering portion 501. The correction value input to the filter coefficient setting portion 504 from the correction value setting portion 506 is a correction value set individually for each of the plurality of mirror faces.

Further, the CPU 303 includes the face identifying portion 507. The face identifying portion 507 is configured to identify a mirror face of the rotary polygon mirror 204 based on an HP signal input from a home position sensor (hereinafter referred to as "HP sensor") 307 of the light scanning device 104 and the BD signal input from the BD 207. The face identifying portion 507 is configured to output information of the identified mirror face to the correction value setting portion 506 as a face synchronization signal.

As illustrated in FIG. 1B, the CPU 303 is configured to receive image data from an image controller (not shown) configured to generate image data. The image data is gradation data indicating a density value. The gradation data is data of a plurality of bits indicating a density value for each pixel. For example, in the case of image data of 4 bits, a density value of one pixel is expressed by 16 gradations, and in the case of image data of 8 bits, a density value of one pixel is expressed by 256 gradations. In the embodiment, the image data input to the CPU 303 from the image controller is 4 bits per pixel. The filtering portion 501 is configured to subject the image data to filtering for each pixel in synchronization with the clock signal CLK(2). The CPU 303 is connected to the rotary encoder 301, the BD 207, the memory 302, the laser drive circuit 304, and the rotary polygon mirror drive portion (hereinafter referred to as "mirror drive portion") 305. The CPU 303 is configured to detect a write position of a scanning line based on the BD signal input from the BD 207 and count a time interval of the BD signal, to thereby detect the rotation speed of the rotary polygon mirror 204. Further, the CPU 303 is configured to output an acceleration or deceleration signal for designating acceleration or deceleration to the mirror drive portion 305 so that the rotary polygon mirror 204 reaches a predetermined speed. The mirror drive portion 305 is configured to supply a driving current to the motor portion of the rotary polygon mirror 204 in accordance with the acceleration or deceleration signal input from the CPU 303, to thereby drive a motor 306.

As illustrated in FIG. 2, the HP sensor 307 is mounted on the rotary polygon mirror 204 and is configured to output the HP signal to the CPU 303 at timing at which the rotary polygon mirror 204 reaches a predetermined angle during a rotation operation. For example, the HP signal is generated once during every rotation of the rotary polygon mirror 204. The face identifying portion 507 resets an internal counter in response to the generation of the HP signal. Then, the face identifying portion 507 increments a count value of the internal counter by "1" every time the BD signal is input. That is, each count value of the internal counter is information indicating a corresponding one of the plurality of mirror faces of the rotary polygon mirror 204. The CPU 303 can identify which of the plurality of mirror faces the input image data corresponds to with use of the count value. That is, the CPU 303 can switch a filter coefficient for correcting the input image data with use of the count value.

The memory 302 is configured to store, for each mirror face, position information (first scanning position information) indicating positional deviation amounts from ideal scanning positions in the sub-scanning direction of a plurality of laser beams reflected by the mirror faces of the rotary polygon mirror 204. Further, the memory 302 is configured to store position information (second scanning position information) indicating a positional deviation amount from the ideal scanning position in the sub-scanning direction of the laser beam emitted from each light emitting point. The CPU 303 is configured to read each of the first scanning position information and the second scanning position information. The CPU 303 is configured to calculate the position of each scanning line based on the position information read from the memory 302 and calculate image data taking information for correcting the position of each scanning line into account from the calculated position of each scanning line and the input image data. The PWM signal generating portion 503 of the CPU 303 is configured to convert the image data taking the information for correcting the position of each scanning line into account into drive data. A ROM 309 is configured to store a conversion table for converting image data of 4 bits into drive data of 16 bits as shown in FIG. 17. A vertical axis of the conversion table shown in FIG. 17 represents image data indicating density values of 4 bits, which corresponds to one pixel. A horizontal axis of the conversion table shown in FIG. 17 represents drive data of 16 bits associated with the density values of 4 bits individually. For example, in the case where image data input to the PWM signal generating portion 503 is a bit pattern of "0110", the PWM signal generating portion 503 converts the image data "0110" into drive data that is a bit pattern of "0000000001111111" with use of the conversion table. The PWM signal generating portion 503 outputs the converted drive data in the order of "0000000001111111" serially on a bit basis in accordance with the clock signal (1) described later. When the PWM signal generating portion 503 outputs the drive data, a PWM signal is generated. When the PWM signal generating portion 503 outputs "1", a light emitting point emits a laser beam. When the PWM signal generating portion 503 outputs "0", a light emitting point does not output a laser beam.

<Scanning Position Information>

Next, scanning position information stored in the memory 302 will be described with reference to FIG. 3 and Table 1.

Figure 3:
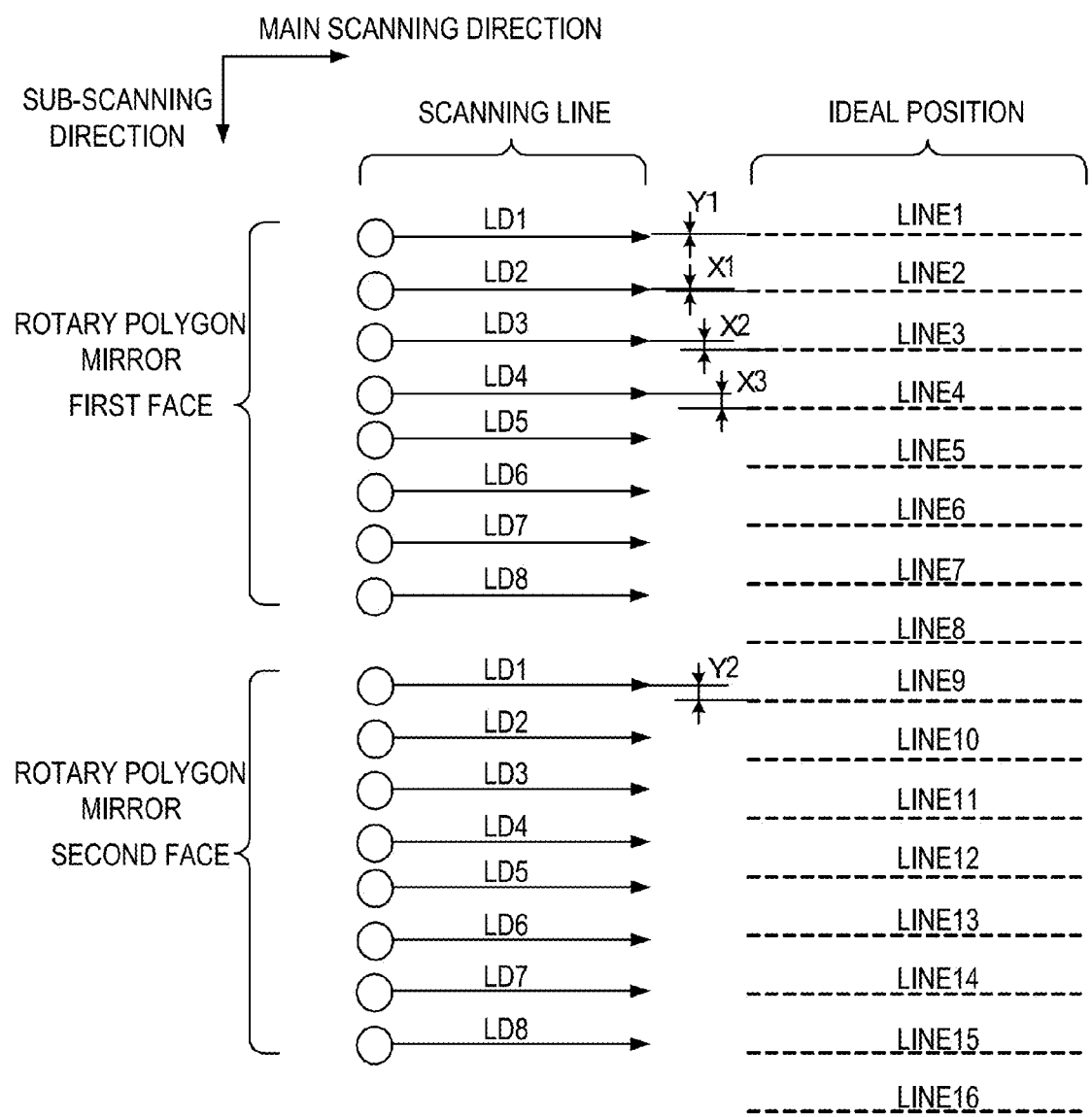
FIG. 3 is a diagram for illustrating positional deviation of scanning lines according to the first and second embodiments.

FIG. 3 is an illustration of a state of positional deviation of each scanning line from an ideal position. Scanning lines scanned by each laser beam of the laser light source having eight light emitting points are denoted by LD1, LD2, LD3, LD4, LD5, LD6, LD7, and LD8. An ideal interval between the respective scanning lines is determined based on a resolution. For example, in the case of an image forming apparatus having a resolution of 1,200 dpi, an ideal interval between the respective scanning lines is 21.16 μm. When the scanning line LD1 is defined as a reference position, ideal distances D2 to D8 of the scanning lines LD2 to LD8 from the scanning line LD1 are calculated by Expression (1).

$$Dn=(n-1)\times 21.16 \text{ μm } (n=2 \text{ to } 8) \quad \text{Expression (1)}$$

For example, the ideal distance D4 from the scanning line LD1 to the scanning line LD4 is 63.48 μm (=(4−1)×21.16 μm).

In this case, an interval between the scanning lines on the photosensitive drum 102 has an error due to an error of arrangement intervals of the plurality of light emitting points and characteristics of a lens. The positional deviation amounts of the scanning line positions of the scanning lines LD2 to LD8 with respect to ideal positions determined based on the ideal distances D2 to D8 are denoted by X1 to X7. Regarding the first face of the rotary polygon mirror 204, for example, the positional deviation amount X1 of the scanning line LD2 is defined as a difference between the ideal position of the scanning line LD2 (hereinafter referred to as "LINE 2", which similarly applies to the other scanning lines) and the actual scanning line. Further, for example, the positional deviation amount X3 of the scanning line LD4 is defined as a difference between the LINE 4 and the actual scanning line.

Due to a variation in manufacturing of each mirror face of the rotary polygon mirror 204, the mirror faces of the rotary polygon mirror 204 are not completely parallel to the rotary shaft, and the rotary polygon mirror 204 has an angle variation for each mirror face. The positional deviation amounts with respect to the ideal positions in each mirror face of the rotary polygon mirror 204 are denoted by Y1 to Y5 when the number of the mirror faces of the rotary polygon mirror 204 is five. In FIG. 3, a deviation amount of the scanning line LD1 from the ideal position (LINE 1) in the first face of the rotary polygon mirror 204 is denoted by Y1, and a deviation amount of the scanning line LD1 from the ideal position (LINE 9) in the second face of the rotary polygon mirror 204 is denoted by Y2.

A mirror face of the rotary polygon mirror 204 is defined as an m-th face, and a positional deviation amount of a scanning line (LDn) by an n-th laser beam from the laser light source is denoted by Zmn. Then, the positional deviation amount Zmn is represented by Expression (2) with use of the positional deviation amounts X1 to X7 of each scanning line and the positional deviation amounts Y1 to Y5 of each mirror face.

$$Zmn=Ym+X(n-1) \ (m=1 \text{ to } 5, n=1 \text{ to } 8) \quad \text{Expression (2)}$$

where X(0)=0

For example, a positional deviation amount Z14 regarding the scanning line LD4 in the first face of the rotary polygon mirror 204 is determined to be Z14=Y1+X3 by Expression (2). Further, a positional deviation amount Z21 regarding the scanning line LD1 in the second face of the rotary polygon mirror 204 is determined to be Z21=Y2 by Expression (2).

When the positional deviation amount Zmn is calculated by Expression (2), it is only necessary that the number of pieces of data to be used for calculating the positional deviation amount Zmn correspond to the number of the mirror faces of the rotary polygon mirror 204 and the number of light emitting points of the laser light source. An address map of positional deviation data stored in the memory 302 is shown in Table 1.

TABLE 1

| Address | Data |
| --- | --- |
| 0 | LD2 Position Information X1 |
| 1 | LD3 Position Information X2 |
| 2 | LD4 Position Information X3 |
| 3 | LD5 Position Information X4 |
| 4 | LD6 Position Information X5 |
| 5 | LD7 Position Information X6 |
| 6 | LD8 Position Information X7 |
| 7 | First Face Position Information Y1 |
| 8 | Second Face Position Information Y2 |
| 9 | Third Face Position Information Y3 |
| 10 | Fourth Face Position Information Y4 |
| 11 | Fifth Face Position Information Y5 |

As shown in Table 1, information on the respective positional deviation amounts (described as position information) X1 to X7 of the scanning line LD2 to the scanning line LD8 is stored in from an address 0 to an address 6 of the memory 302. Further, information on the respective positional deviation amounts Y1 to Y5 of the first face to the fifth face of the mirror faces of the rotary polygon mirror 204 is stored in from an address 7 to an address 11 of the memory 302. In the embodiment, description is given on the assumption that the eight scanning lines of each laser beam are deviated uniformly due to the positional deviation of each mirror face of the rotary polygon mirror 204. That is, in the embodiment, twelve pieces of position information are stored in the memory 302. However, when there is a variation in positional deviation amount of each scanning line of a laser beam for each mirror face of the rotary polygon mirror 204, there may be stored information on a positional deviation amount only for a combination of each mirror face of the rotary polygon mirror 204 and each scanning line of the laser beam. That is, in this case, forty pieces of position information are stored in the memory 302 with the number of the mirror faces of the rotary polygon mirror 204 being five, and the number of light emitting points of the laser light source being eight.

(Memory Storage Operation)

As information on a positional deviation amount to be stored in the memory 302, for example, data measured at the time of adjustment of the light scanning device 104 in a factory or the like is stored. Further, the image forming apparatus 100 may include a position detection unit configured to detect the position of a scanning line scanned with a laser beam emitted from the laser light source 201 so that the information stored in the memory 302 may be updated in real time. As the position detection unit configured to detect a position of scanning light in the sub-scanning direction, a known technology may be used. For example, a position may be detected by a CMOS sensor or a position sensitive detector (PSD) arranged in the light scanning device 104 or arranged on a scanning path of a laser beam near the photosensitive drum 102. Further, a triangular slit may be formed in a surface of a photo diode (PD) arranged in the light scanning device 104 or arranged near the photosensitive drum 102, to thereby detect a position from an output pulse width of the PD.

Figure 4:
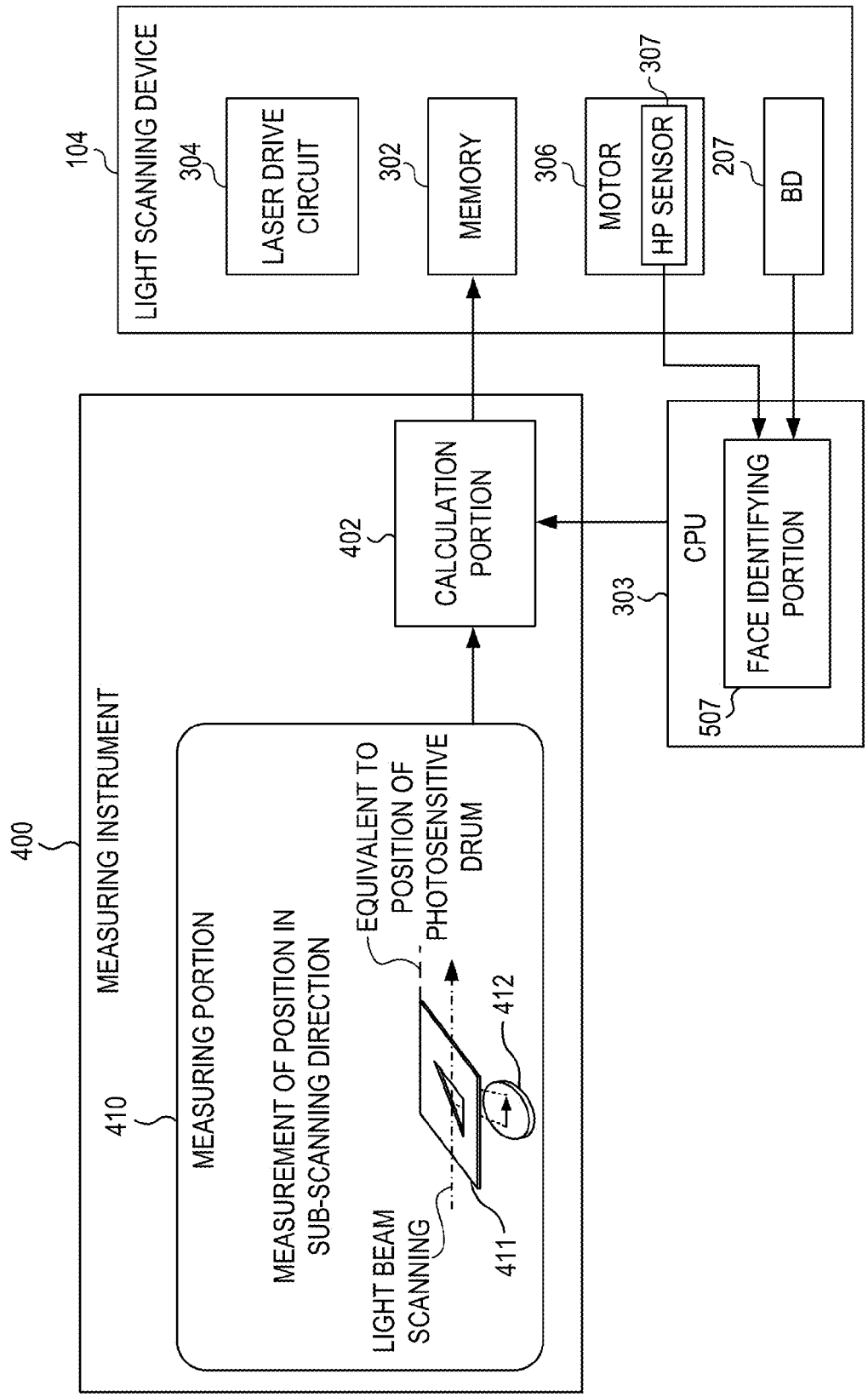
FIG. 4 is a block diagram for illustrating a step of storing information in a memory according to the first and second embodiments.

FIG. 4 is a block diagram for illustrating a step of storing information in the memory 302 of the light scanning device 104 in a factory or the like as an example. The same configurations as those of FIG. 2 are denoted by the same reference symbols as those therein, and the description thereof is omitted. At the time of adjustment of the light scanning device 104, a measuring instrument 400 is arranged at a position corresponding to the scanning position on the photosensitive drum 102 when the light scanning device 104 is mounted on the image forming apparatus 100. The measuring instrument 400 includes a measuring portion 410 and a calculation portion 402, and the calculation portion 402 is configured to receive a face synchronization signal from the face identifying portion 507 of the CPU 303 of FIG. 2. In the CPU 303 of FIG. 4, only the face identifying portion 507 is illustrated. First, a laser beam is radiated to the measuring portion 410 from the light scanning device 104. The measuring portion 410 includes a triangular slit 411 and a PD 412. A laser beam emitted from the light scanning device 104 indicated by the arrow with the alternate long and short dash line in FIG. 4 scans the triangular slit 411. The measuring portion 410 measures the position in the sub-scanning direction of a scanning line based on information on the laser beam input to the PD 412 through the triangular slit 411. The measuring portion 410 outputs information on the measured position in the sub-scanning direction of the scanning line in each mirror face (hereinafter referred to as "data for each face") of the rotary polygon mirror 204 to the calculation portion 402.

Meanwhile, the face identifying portion 507 is configured to receive the HP signal from the HP sensor 307 of the light scanning device 104 and receive the BD signal from the BD 207. With this, the face identifying portion 507 is configured to identify a mirror face of the rotary polygon mirror 204 and output information on the identified mirror face to the calculation portion 402 as a face synchronization signal. The calculation portion 402 is configured to write the information on the position in the sub-scanning direction of the scanning line measured by the measuring portion 410 into an address on the memory 302 of the light scanning device 104 in accordance with the information on the mirror face of the rotary polygon mirror 204 input from the face identifying portion 507. Thus, the information on the positional deviation amounts of the scanning lines caused by a variation in intervals between the eight light emitting points of the laser light source 201 (X1 to X7) and the information on the positional deviation amounts of the scanning lines caused by an optical face tangle error of the mirror face of the rotary polygon mirror 204 (Y1 to Y5) are stored in the memory 302.

<Calculation Method for Positional Deviation Amount>

Figure 5:
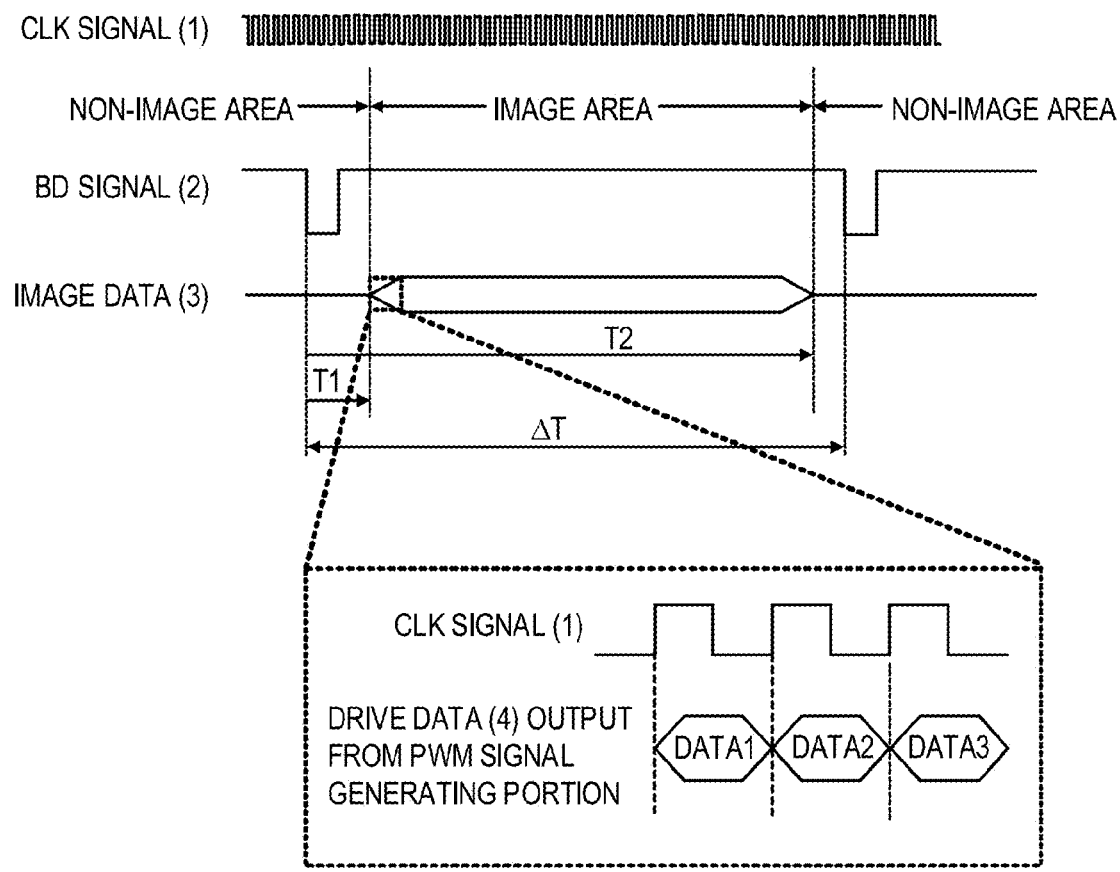
FIG. 5 is a time chart for illustrating one scanning period according to the first and second embodiments.

FIG. 5 is an illustration of control timing in one scanning period of a laser beam in the embodiment. (1) represents a CLK signal corresponding to a pixel period per divided pixel (1/16 pixel) obtained by dividing one pixel by 16, and (2) represents input timing of the BD signal from the BD 207 to the CPU 303. (3) and (4) are each an illustration of timing at which the CPU 303 outputs drive data (DATA1, DATA2, etc.). (4) represents drive data after the filtering.

With the BD signal output from the BD 207 being a reference, during a period of time from timing at which the BD signal is input to the CPU 303 to timing at which a subsequent BD signal is input to the CPU 303, a period of time from timing at which the BD signal is input to the CPU 303 to timing at which the processing of the image data input to the CPU 303 is started is defined as T1. Further, during the period of time from timing at which the BD signal is input to the CPU 303 to timing at which a subsequent BD signal is input to the CPU 303, a period of time from timing at which the BD signal is input to the CPU 303 to timing at which the output of the image data input to the CPU 303 is completed is defined as T2. After the BD signal is input to the CPU 303, the CPU 303 stands by until the predetermined period of time T1 elapses. Then, the CPU 303 starts the filtering of the input image data in synchronization with the clock signal CLK(2) to generate drive data successively from the processed image data and output the drive data on a bit basis, to thereby output the PWM signal to the laser drive circuit 304. Then, after the predetermined period of time T2 elapses from the input of the BD signal, the CPU 303 finishes the processing of the image data in one scanning line. The CPU 303 calculates, for each scanning, a positional deviation amount of the scanning line in the scanning period until the predetermined period of time T1 elapses from the detection of the BD signal, that is, while the laser beam scans a non-image area. Then, the CPU 303 causes the filter coefficient setting portion 594 to set a filter coefficient based on the calculated positional deviation amount. Then, the CPU 303 causes, for each scanning, the filtering portion 501 to correct the image data with use of the filter coefficient set by the filter coefficient setting portion 504 until the predetermined period of time T2 elapses from the elapse of the predetermined period of time T1.

(Calculation of Positional Deviation Amount Taking Uneven Speed of Photosensitive Drum into Account)

Figure 6:
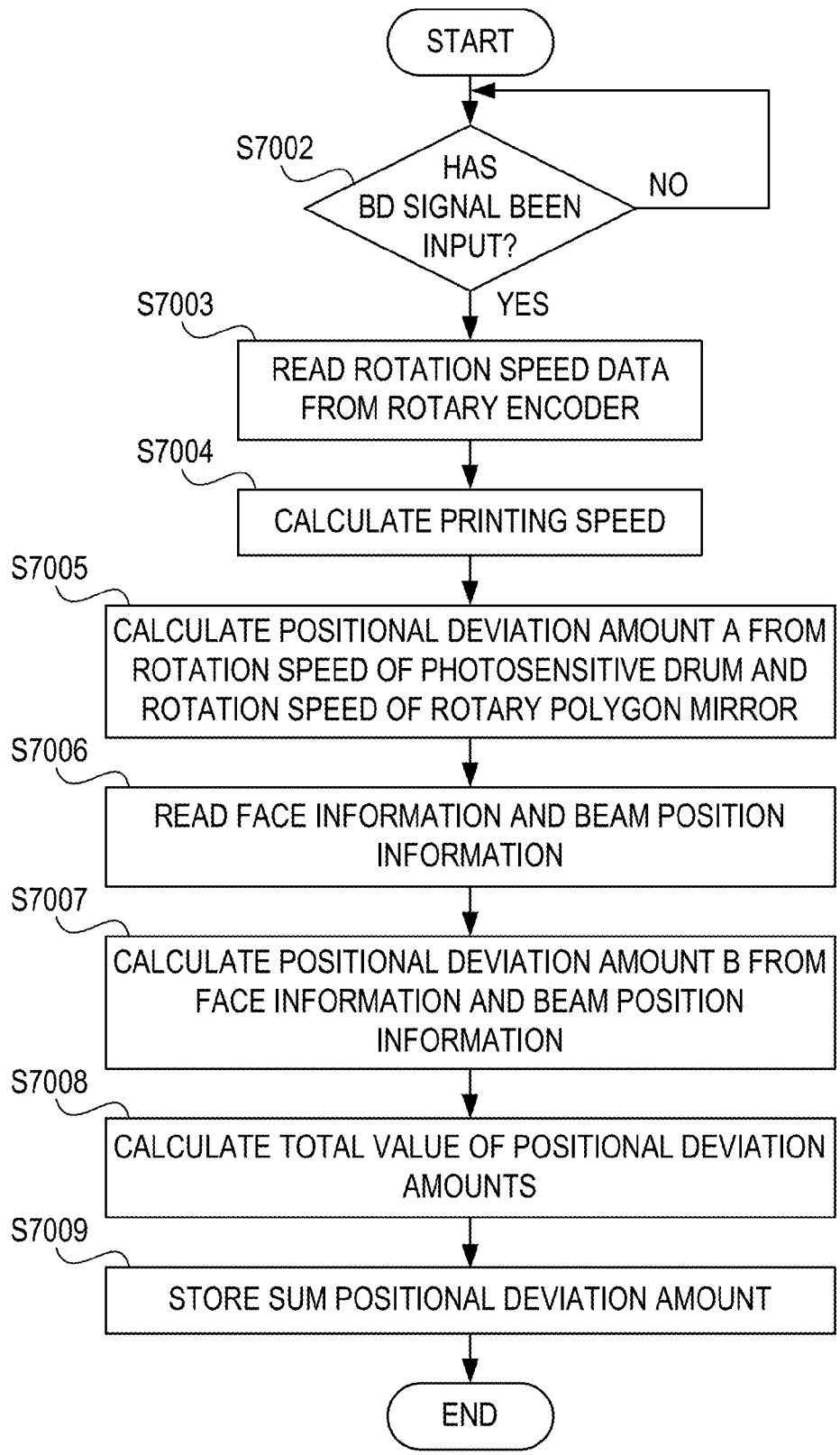
FIG. 6 is a flowchart for illustrating processing of calculating a positional deviation amount according to the first and second embodiments.

Next, processing of calculating a positional deviation amount of a scanning line will be described. FIG. 6 is a flowchart for illustrating processing performed by the CPU 303 to calculate a positional deviation amount during image formation. The CPU 303 is configured to perform the control illustrated in FIG. 6 once per scanning, to thereby calculate a positional deviation amount before the predetermined period of time T1 elapses from the detection of the BD signal. The CPU 303 is assumed to include a timer for measuring a time. In Step S7002, the CPU 303 determines whether or not the BD signal has been input from the BD 207. When the CPU 303 determines that the BD signal has been input (YES in S7002), the CPU 303 stops a timer (not shown) measuring a time interval of the BD signal, reads a timer value, and stores the timer value in an internal register. Then, in order to measure a time interval up to reception of the next BD signal, the CPU 303 resets and starts the timer (not shown) and proceeds to processing in Step S7003. In the case where the CPU 303 includes two or more timers (not shown), different timers may be used alternately every time the BD signal is received, to thereby measure a time interval. Further, in this case, the measured time interval of the BD signal is stored in the internal register of the CPU 303, but the measured time interval may be stored in, for example, a RAM (not shown) serving as an internal storage portion of the CPU 303. When the CPU 303 determines that the BD signal has not been input (NO in S7002), the CPU 303 repeats the control in Step S7002 so as to wait for the input of the BD signal.

In Step S7003, the CPU 303 reads rotation speed data of the photosensitive drum 102 from the rotary encoder 301. In Step S7004, the CPU 303 calculates a printing speed Vpr based on the time interval of the BD signal stored in the internal register. The printing speed Vpr is calculated by dividing a value, which is obtained by multiplying the number of beams of the laser light source 201 by the interval of the scanning lines, by $\Delta T$ (time interval of the BD signal). For example, in the case of the embodiment, the number of beams is eight, and the interval of the scanning lines is 21.16 µm (resolution: 1,200 dpi), and hence Vpr=(8×21.16 µm)/$\Delta T$ is satisfied. A rotation speed Vp of the rotary polygon mirror 204 has a proportional relationship with the printing speed Vpr, and hence can be determined from the calculated printing speed Vpr. In Step S7005, the CPU 303 calculates a positional deviation amount A based on the rotation speed of the photosensitive drum 102 read in Step S7003 and the rotation speed of the rotary polygon mirror 204 calculated in Step S7004. A calculation method for the positional deviation amount A will be described in detail later.

In Step S7006, the CPU 303 reads face information (Y1 to Y5 in Table 1) and beam position information (X1 to X7 in Table 1) of the rotary polygon mirror 204 from the memory 302. In Step S7007, the CPU 303 calculates a positional deviation amount B (=Zmn) with use of Expression (2) based on the face information and the beam position information read in Step S7006. In Step S7008, the CPU 303 adds up the positional deviation amount A calculated in Step S7005 and the positional deviation amount B calculated in Step S7007, to thereby calculate a sum (total value) of the positional deviation amounts. In Step S7009, the CPU 303 stores the total positional deviation amount calculated in Step S7008 in the internal register of the CPU 303. In this case, the positional deviation amount stored in the internal register is read and used for calculation at a time of the filtering described above.

(Calculation of Positional Deviation Amount)

An expression for calculation of the positional deviation amount A by the CPU 303 in Step S7005 will be described in detail. When the rotation speed of the photosensitive drum 102 is denoted by Vd, the rotation speed of the rotary polygon mirror 204 is denoted by Vp, and one scanning period is denoted by $\Delta T$ (see FIG. 5), the positional deviation amount A caused by a speed difference between the rotation speed Vd of the photosensitive drum 102 and the rotation speed Vp of the rotary polygon mirror 204 is calculated by Expression (3).

$$A=(Vd-Vp)\times\Delta T \qquad \text{Expression (3)}$$

In Expression (3), $\Delta T$ represents a period of time corresponding to an interval of output timing of the BD signal, and the positional deviation amount A represents a positional deviation amount of scanning lines that move during one scanning period due to the difference between the rotation speed Vd of the photosensitive drum 102 and the rotation speed Vp of the rotary polygon mirror 204. As described above, the rotation speed Vp of the rotary polygon mirror 204 is determined based on the printing speed Vpr. Then, the printing speed Vpr is determined based on the relationship between the one scanning period $\Delta T$ and the number of light emitting points (the light emitting points are eight in the embodiment) by Expressions (4) and (5).

$$Vp=\text{Number of beams}\times 21.16/\Delta T \qquad \text{Expression (4)}$$

$$\Delta T=1/(\text{Number of mirror faces of rotary polygon mirror 204}\times\text{Number of revolutions per second of rotary polygon mirror 204}) \qquad \text{Expression (5)}$$

When the positional deviation caused by an uneven speed of the photosensitive drum 102 of the n-th scanning line from the reference position in the sub-scanning direction is denoted by An, the positional deviation in the sub-scanning direction is represented by an accumulation of the positional deviation of each scanning. Further, when the positional deviation amount based on the face information of the rotary polygon mirror 204 of the n-th scanning line from the reference position in the sub-scanning direction and the beam information is denoted by Bn, the position y in the sub-scanning direction of the n-th scanning line is represented by Expression (6).

$$y = n + \left(B_n + \sum_{p=1}^{n} A_p\right) \quad \text{Expression (6)}$$

The value "y" on the left side of Expression (6) is defined only when "n" is an integer. That is, the value "y" is a discrete function. However, in the embodiment, each value "y" determined from an integer is interpolated by linear interpolation and handled as a continuous function y=ft(n) as described later. In the embodiment, linear interpolation is used so as to simplify hardware, but interpolation of the function may be performed by other methods such as Lagrange interpolation and spline interpolation.

When the pixel positions in the sub-scanning direction of pixel numbers n0 and n0+1 in the embodiment are denoted by $y_{n0}$ and $y_{n0+1}$, an expression of conversion into the continuous function within a range of from the pixel position $y_{n0}$ to the pixel position $y_{n0+1}$ in the sub-scanning direction is given below.

$$y = y_{n0} \times (1-n+n0) + y_{n0+1} \times (n-n0) \quad \text{Expression (7)}$$

The processing of FIG. 6 is performed once per scanning, that is, once for eight beams (eight scanning lines). Therefore, in Steps S7006 to S7008, the positional deviation amounts of the eight beams are collectively calculated, and all the calculated positional deviation amounts of the eight beams are stored in Step S7009. Further, in the embodiment, the rotation speed data of the photosensitive drum 102 is obtained in real time from the rotary encoder 301 and fed back to positional deviation correction. However, a profile of speed fluctuation data measured in advance may be stored in the memory 302, and positional deviation may be corrected in accordance with the stored profile. Further, when positional deviation information is obtained in real time, the positional deviation information may be used as it is for correction of the positional deviation although control is delayed. In this case, in order to prevent the influence due to the delayed control, a particular frequency component, e.g., a high-frequency component of a fluctuation amount of positional deviation may be filtered to be used for correction.

Then, in the embodiment, a filter operation described later is performed based on the image data and the positional deviation amounts of a plurality of scanning lines. Therefore, in the above-mentioned positional deviation amount calculation operation, the CPU 303 is configured to determine positional deviation amounts of a plurality of scanning lines to be used in the filter operation during a period in which the period of time T1 elapses from the output of the BD signal from the BD 207. For example, when the range of the filter operation is defined as L=3, image data on three pixels above and below a line of interest is referred to, and a positional deviation amount of each scanning line within the range of the three pixels above and below the line of interest is calculated, to thereby perform the filter operation.

In this case, the positional deviation amount of the scanning line corresponding to the line of interest is calculated during a period immediately before image formation. Further, the calculation results of the positional deviation amounts calculated before are used for the scanning lines scanned before the scanning line of interest. For a scanning line to be scanned at timing after the scanning line of interest, a positional deviation amount B is determined based on the face information of the rotary polygon mirror 204 corresponding to the next scanning line and the beam position information. Further, a rotation speed Vp of the rotary polygon mirror 204 and a rotation speed Vd of the photosensitive drum 102 are determined by predicting each speed in a next scanning line based on a value detected at previous scanning timing and a value detected at current scanning timing. The details of the calculation method for a positional deviation amount will be described later.

<Method for Filter Operation of Image Data>

Figure 7:
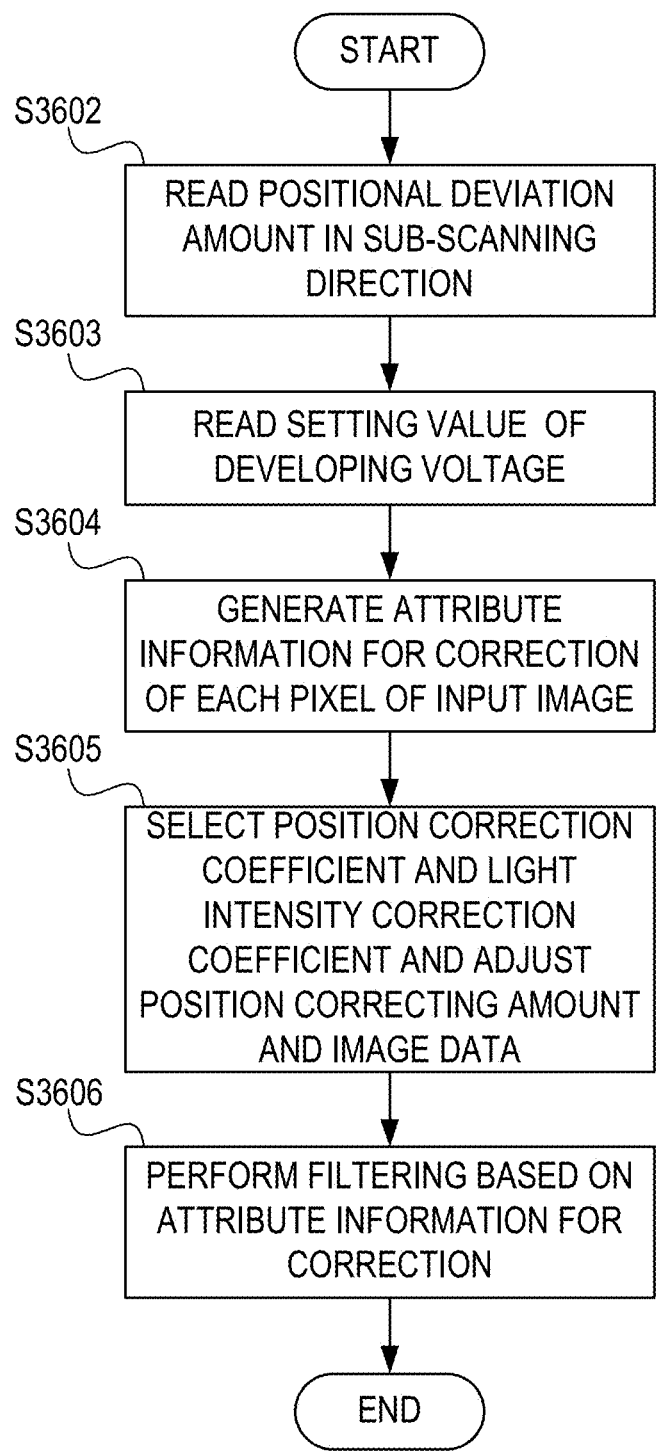
FIG. 7 is a flowchart for illustrating correction processing according to the first and second embodiments.

In the embodiment, the CPU 303 is configured to perform processing of correcting image data through a filter operation based on the positional deviation amounts in the sub-scanning direction of the scanning lines formed by laser beams and output drive data generated based on the corrected image data to the laser drive circuit 304. The filter operation is specifically an operation of performing convolution processing, and in the embodiment, the convolution processing is performed based on the image data and the positional deviation amount. Now, the filter operation will be described with reference to a flowchart of FIG. 7. FIG. 7 is a flowchart for illustrating a filter operation for correcting uneven image density and banding caused by the positional deviation in the sub-scanning direction. In Step S3602, the CPU 303 reads a positional deviation amount in the sub-scanning direction. Specifically, the CPU 303 reads a positional deviation amount stored in the internal register in Step S7009 of FIG. 6. In the embodiment, a pixel position in the sub-scanning direction of input image data is corrected based on the positional deviation amount in the sub-scanning direction, followed by the filtering, to thereby output image data, that is, density. The convolution processing according to the embodiment is the processing involving correcting sparseness and denseness of density in the sub-scanning direction caused by deviation of a scanning line in the sub-scanning direction by moving a pixel of interest in the sub-scanning direction in accordance with the deviation of the scanning line. The convolution processing is processing involving correcting the sparseness and denseness of density by causing a pixel value of the pixel of interest to be output or not to be output depending on the movement in the sub-scanning direction.

(State of Positional Deviation of Scanning Line)

The state of positional deviation of a scanning line can be roughly classified into four cases. First, regarding the state of positional deviation, there is a case (a) in which the position of a scanning line (hereinafter referred to as "scanning position") on the photosensitive drum 102 is shifted in an advance direction with respect to an ideal scanning position, and a case (b) in which the scanning position on the photosensitive drum 102 is shifted in a return direction with respect to the ideal scanning position. Further, regarding the state of positional deviation, there is a case (c) in which the scanning positions on the photosensitive drum 102 are dense with respect to the ideal scanning positions, and a case (d) in which the scanning positions on the photosensitive drum 102 are sparse with respect to the ideal scanning positions. Specific examples of the state of positional deviation in the sub-scanning direction are illustrated in FIG. 8A, FIG. 8B, FIG. 8C, and FIG. 8D. In FIG. 8A to FIG. 8D, the broken lines represent scanning positions, and in FIG. 8A to FIG. 8D, (1) to (5) represent the order of scanning. In the embodiment, eight beams are used for scanning simultaneously, but description is given on the assumption that the order is allocated to each beam arranged successively in the sub-scanning direction. Each column on the left side of FIG. 8A to FIG. 8D represents ideal scanning positions, and each column on the right side thereof represents scanning positions on the photosensitive drum 102. S1 to S5 represent positional deviation amounts from the ideal scanning positions with respect to scanning numbers (1) to (5). The unit of a positional deviation amount is represented based on the case where the ideal beam interval (21.16 μm at 1,200 dpi) is defined as 1, and the advance direction of a laser beam in the sub-scanning direction (hereinafter simply referred to as "advance direction") is set to a positive value. Further, the return direction of the laser beam in the sub-scanning direction (hereinafter simply referred to as "return direction") is set to a negative value. Further, in order to describe the state of an image, each pixel arranged in the sub-scanning direction is represented by a circle on the scanning line. The shading of the circle represents density.

FIG. 8A is an illustration of an example in which the scanning positions on the photosensitive drum 102 are shifted by 0.2 uniformly in the advance direction from the ideal scanning positions. The positional deviation amount as illustrated in FIG. 8A is hereinafter referred to as a shift amount of +0.2. FIG. 8B is an illustration of an example in which the scanning positions on the photosensitive drum 102 are shifted by 0.2 uniformly in the return direction from the ideal scanning positions. The positional deviation amount as illustrated in FIG. 8B is hereinafter referred to as a shift amount of −0.2. In FIG. 8A and FIG. 8B, the scanning positions are shifted uniformly, and hence the interval between the scanning positions on the photosensitive drum 102 is 1 in both the cases.

Figure 8C:
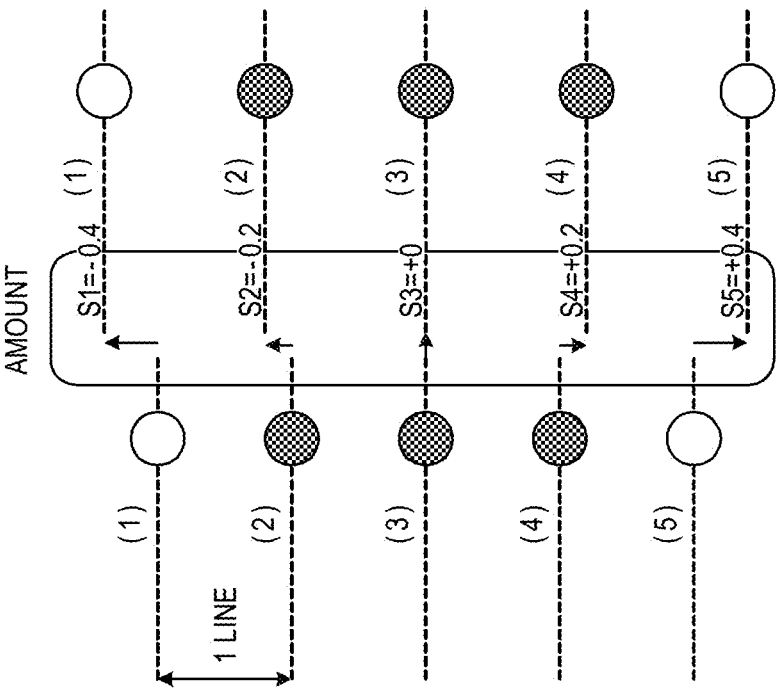

In FIG. 8C, the positional deviation amount is 0 at a predetermined scanning position on the photosensitive drum 102. However, as the scanning position returns backward from the scanning position of the positional deviation amount of 0, the positional deviation amount in the advance direction increases, and as the scanning position proceeds forward from the scanning position of the positional deviation amount of 0, the positional deviation amount in the return direction increases. For example, S3 is +0 in the scanning number (3), but S2 is +0.2 in the scanning number (2), S1 is +0.4 in the scanning number (1), S4 is −0.2 in the scanning number (4), and S5 is −0.4 in the scanning number (5). In FIG. 8C, the interval between the scanning positions is 0.8, which is smaller than 1. The state of positional deviation as illustrated in FIG. 8C is hereinafter referred to as being dense at an interval of a (1−0.2) line.

Figure 8D:
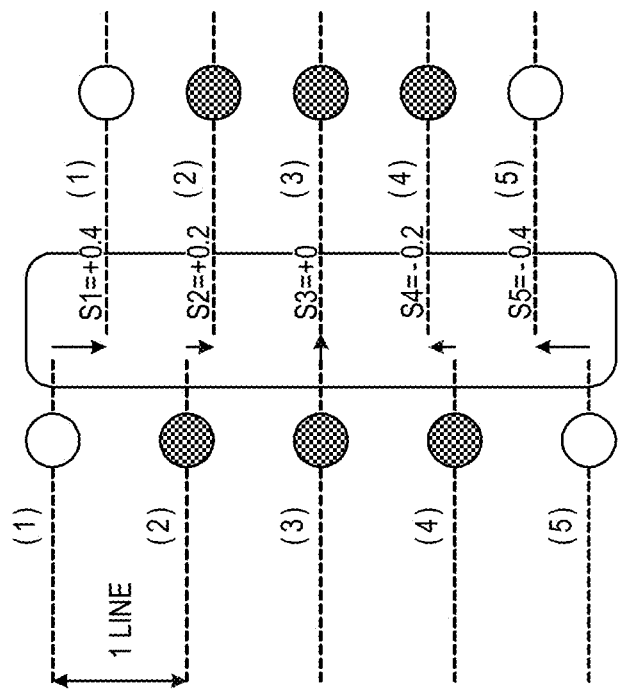

In FIG. 8D, the positional deviation amount is 0 at a predetermined scanning position on the photosensitive drum 102. However, as the scanning position returns backward from the scanning position of the positional deviation amount of 0, the positional deviation amount in the return direction increases, and as the scanning position proceeds forward from the scanning position of the positional deviation amount of 0, the positional deviation amount in the advance direction increases. For example, S3 is +0 in the scanning number (3), but S2 is −0.2 in the scanning number (2), S1 is −0.4 in the scanning number (1), S4 is +0.2 in the scanning number (4), and S5 is +0.4 in the scanning number (5). In FIG. 8D, the interval between the scanning positions is 1.2, which is larger than 1. The state of positional deviation as illustrated in FIG. 8D is hereinafter referred to as being sparse at an interval of a (1+0.2) line.

In the dense state as illustrated in FIG. 8C, positional deviation occurs, and in addition, the scanning positions are dense to cause pixels to be arranged densely on the photosensitive drum 102, with the result that a pixel value per predetermined area increases, to thereby increase density. In contrast, in the sparse state as illustrated in FIG. 8D, positional deviation occurs, and in addition, the scanning positions are sparse to cause pixels to be arranged sparsely on the photosensitive drum 102, with the result that a pixel value per predetermined area decreases, to thereby decrease density. In an electrophotographic process, a shading difference may be further emphasized due to a relationship between the depth of a latent image potential and development characteristics. Further, when the dense or sparse state occurs alternately as illustrated in FIG. 8C and FIG. 8D, a periodic shading causes moire, which is liable to be detected visually even at the same amount depending on a space frequency.

Referring back to the flowchart of FIG. 7, in Step S3603, the CPU 303 reads a setting value of a developing voltage applied by the developing device 105, which is set in the developing voltage drive circuit. In Step S3604, the CPU 303 generates attribute information for correction of each pixel of an input image with the correction value setting portion 506. In the embodiment, the pixel position in the sub-scanning direction of an input image is subjected to coordinate transformation in advance and interpolated, thereby enabling correction of positional deviation and correction of local shading simultaneously while maintaining density of the input image. The attribute information for correction specifically refers to a correction value C described later.

(Coordinate Transformation)

A method for coordinate transformation according to the embodiment will be described with reference to FIG. 9A, FIG. 9B, FIG. 10A, FIG. 10B, FIG. 10C, FIG. 10D, FIG. 11A, and FIG. 11B. In each graph of FIG. 9A to FIG. 11B, a horizontal axis represents a pixel number "n", and a vertical axis represents a pixel position (which is also a scanning position) "y" (y' after the coordinate transformation) in the sub-scanning direction, with the unit being a line. Further, FIG. 9A, FIG. 9B, FIG. 11A, and FIG. 11B correspond to FIG. 8A, FIG. 8B, FIG. 8C, and FIG. 8D, respectively. Each graph on the left side of FIG. 9A, FIG. 9B, FIG. 11A, and FIG. 11B represents the state before the coordinate transformation, and each graph on the right side thereof represents the state after the coordinate transformation for the y-axis. Square dots plotted in each graph represent scanning positions on the photosensitive drum 102, and circular dots therein represent ideal scanning positions.

(Case of being Shifted in Advance Direction and Return Direction)

Figure 9A:
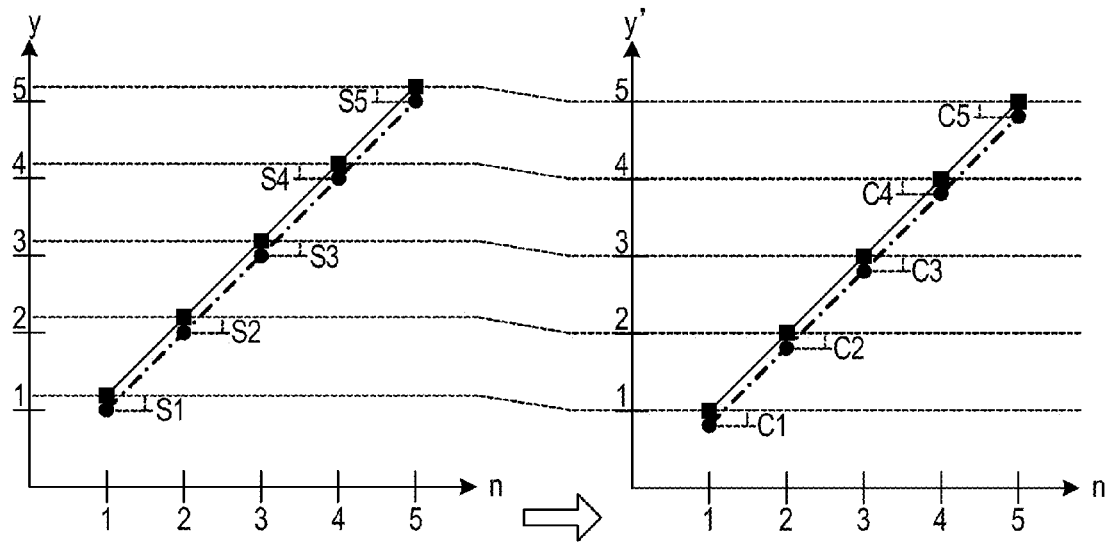
FIG. 9A and FIG. 9B are each a graph for showing coordinate transformation of pixel positions in a sub-scanning direction according to the first and second embodiments.

The graph on the left side of FIG. 9A will be first described. In the graph before the coordinate transformation, at the ideal scanning positions plotted with the circular dots, for example, a pixel position "y" in the sub-scanning direction is 2 with respect to the pixel number 2. Thus, the y-coordinate of the pixel position "y" is equal to that of the pixel number "n", and the ideal scanning positions are represented by a straight line (indicated by the alternate long and short dash line) with a gradient of 1. The straight line of the alternate long and short dash line is represented by Expression (8).

$$y = n \qquad \text{Expression (8)}$$

As illustrated in FIG. 8A, the scanning positions plotted with the square dots are shifted by S (=0.2) line in the advance direction (+ direction of y-axis) with respect to the ideal scanning positions plotted with the circular dots. Therefore, the scanning positions plotted with the square dots are represented by a straight line (indicated by the solid line) offset with the gradient being 1, which is represented by Expression (9).

$$y=n+S \qquad \text{Expression (9)}$$

In the embodiment, the coordinate transformation is performed so that the actual scanning positions are transformed into the ideal scanning positions. Therefore, in the example illustrated in FIG. 9A, it is only necessary that the coordinate transformation be performed with use of Expression (10). In Expression (10), C represents a correction amount.

$$y'=y+C \qquad \text{Expression (10)}$$

Thus, the correction amount C is represented by a shift amount S and Expression (11).

$$C=-S \qquad \text{Expression (11)}$$

Through Expression (10) of the coordinate transformation and Expression (11) for determining the correction amount C, Expressions (8) and (9) are converted as represented by Expressions (12) and (13), respectively.

$$y'=y+C=n+(-S)=n-S \qquad \text{Expression (12)}$$

$$y'=y+C=(n+S)+C=(n+S)+(-S)=n \qquad \text{Expression (13)}$$

Figure 9B:
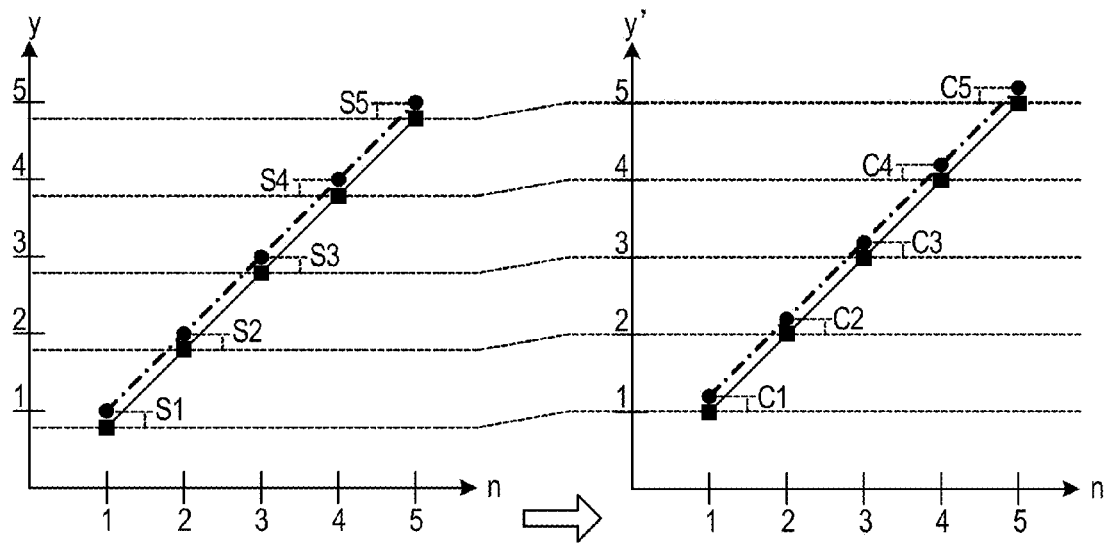

In FIG. 9B, when the shift amount S is defined as −0.2, Expression (13) similarly holds from Expression (8), and the similar description to that of FIG. 9A can be given. As illustrated in FIG. 9A and FIG. 9B, when the scanning lines are not sparse or dense, and are shifted in the advance direction or the return direction, a straight line has a predetermined gradient before and after the coordinate transformation.

(Case in which Dense or Sparse State Occur)

Figure 10A:
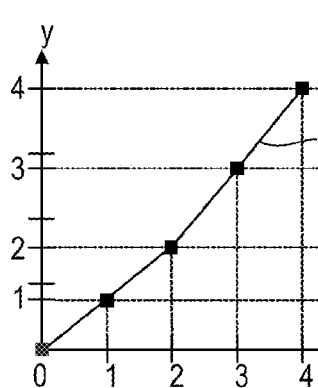
FIG. 10A, FIG. 10B, FIG. 10C, and FIG. 10D are each a graph for showing coordinate transformation of pixel positions in the sub-scanning direction according to the first and second embodiments.

Now, the coordinate transformation will be described, which is also applicable to the cases in FIG. 11A and FIG. 11B in which the scanning positions become dense or sparse, and the cases of combinations of FIG. 9A, FIG. 9B, FIG. 11A, and FIG. 11B in which a shift and a dense or sparse state occur. FIG. 10A is an illustration of a relationship between the pixel number and the scanning position, and a horizontal axis represents a pixel number "n", and a vertical axis "y" represents a scanning position in the sub-scanning direction, square dots being plotted as the scanning positions on the photosensitive drum 102. In FIG. 10A, the case is described in which the scanning lines are dense on the photosensitive drum 102 within a range of the pixel number of n≤2, and the scanning lines are sparse on the photosensitive drum 102 within a range of the pixel number of n≥2.

As illustrated in FIG. 10A, when the scanning lines are dense within the range of the pixel number of n≤2, and are sparse within the range of the pixel number of n≥2, the gradient of a straight line within the range of the pixel number of n≤2 is different from that of a straight line within the range of the pixel number of n≥2, and the straight line has a curved shape at the pixel number of n=2. In FIG. 10A, a function indicating a change in scanning positions passing through the square dots is defined as ft(n) and is represented by the solid line. The function ft(n) representing the scanning positions is represented by Expression (14).

$$y=ft(n) \qquad \text{Expression (14)}$$

Next, when a function after the coordinate transformation of the y-axis that represents the scanning positions in the sub-scanning direction is defined as ft'(n), the function ft'(n) representing the scanning positions after the coordinate transformation is represented by Expression (15).

$$y'=ft'(n) \qquad \text{Expression (15)}$$

In the embodiment, the coordinate transformation is performed by expanding or contracting the y-axis or shifting the y-axis so that the scanning positions after the coordinate transformation become uniform. Therefore, the function ft'(n) representing the scanning positions after the coordinate transformation satisfies the condition represented by Expression (16).

$$ft'(n)=n \qquad \text{Expression (16)}$$

Expression (16) means that, for example, a pixel position y' (=ft'(2)) in the sub-scanning direction after the coordinate transformation becomes 2 with respect to the pixel number 2.

Figure 10B:
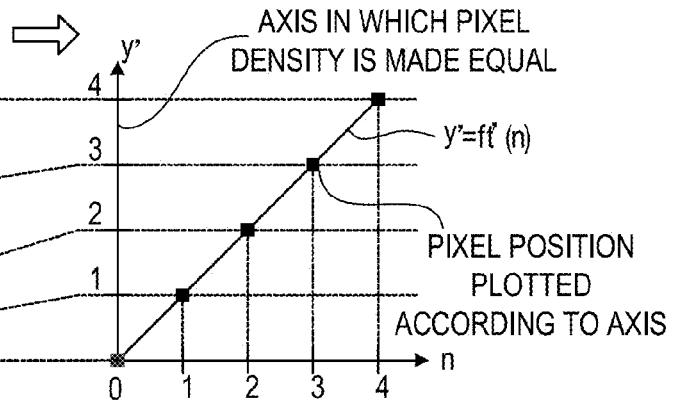
Figure 10C:
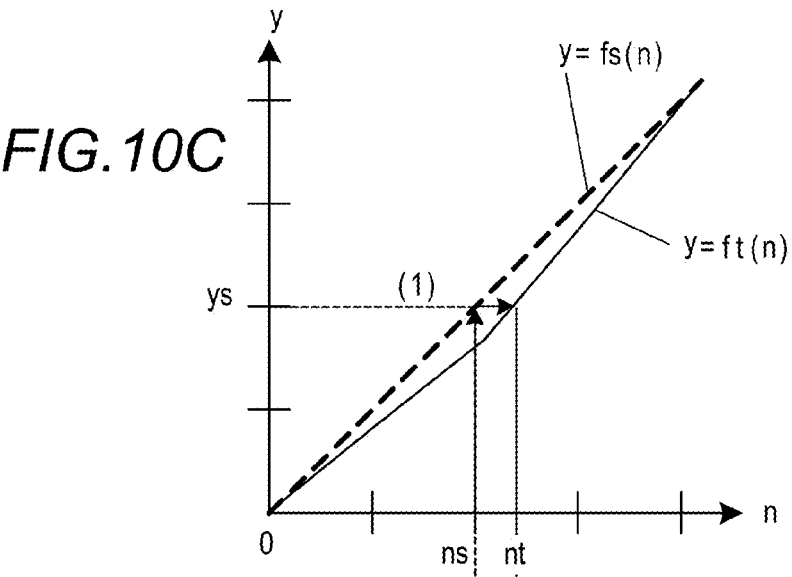
Figure 10D:
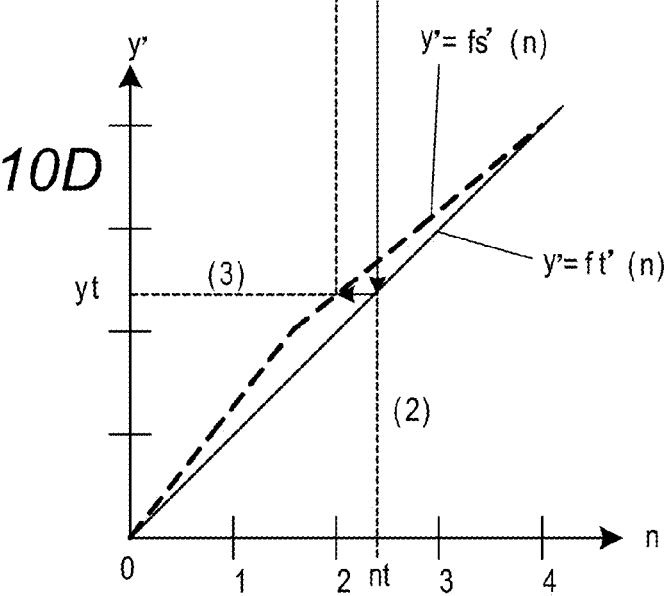

The broken lines connecting FIG. 10A and FIG. 10B to each other represent the correspondence from an original coordinate position of the y-axis to a coordinate position of the y'-axis after the coordinate transformation from the left to the right, and indicate a state in which a lower half (corresponding to n≤2) of the y-axis expands, and an upper half (corresponding to n≥2) contracts before and after the coordinate transformation. A procedure for determining a coordinate after the coordinate transformation of each pixel of input image data through the coordinate transformation of FIG. 10A and FIG. 10B will be described with reference to FIG. 10C and FIG. 10D. In the same manner as in FIG. 10A and FIG. 10B, a horizontal axis in FIG. 10C and FIG. 10D represents a pixel number n, and a vertical axis "y" (or y') represents scanning positions in the sub-scanning direction. FIG. 10C is an illustration before the coordinate transformation, and FIG. 10D is an illustration after the coordinate transformation. A relationship between the pixel number n and the coordinate position "y" of the input image data will be described below. First, the broken line of FIG. 10C represents a function fs(n) representing ideal scanning positions before the coordinate transformation and is represented by Expression (17).

$$y=fs(n) \qquad \text{Expression (17)}$$

Further, in the embodiment, the interval between the pixels in the sub-scanning direction of the input image data is uniform, and hence the function fs(n) is represented by Expression (18).

$$fs(n)=n \qquad \text{Expression (18)}$$

A scanning position of the y'-coordinate after the coordinate transformation of a pixel number of interest ns of the input image data is determined through three steps described below. In the first step, when the y-coordinate of an ideal scanning position corresponding to the pixel number ns of the input image data is defined as ys, ys can be determined by Expression (19).

$$ys=fs(ns) \qquad \text{Expression (19)}$$

A pixel number "nt" in which the scanning position before the coordinate transformation is the same on the photosensitive drum 102 (solid line) is determined ((1) of FIG. 10C). The scanning position on the photosensitive drum 102 is represented by the function y=ft(n), and a relationship of ys=ft(nt) holds. When an inverse function of the function ft(n) is defined as ft$^{-1}$(y), the pixel number "nt" is represented by Expression (20).

$$nt=ft^{-1}(ys) \quad \text{Expression (20)}$$

In the second step, the y'-coordinate after the coordinate transformation (defined as "yt") corresponding to the pixel number "nt" of the scanning position on the photosensitive drum 102 is determined by Expression (21) with use of the function ft'(n) after the coordinate transformation ((2) of FIG. 10D).

$$yt=ft'(nt) \quad \text{Expression (21)}$$

The pixel number ns holds even when any number is selected, and hence an expression for determining the position "yt" of the y'-coordinate after the coordinate transformation based on the pixel number ns corresponds to the function fs'(n) for determining the y'-coordinate in calculation based on the pixel number n of the input image data. Thus, a general expression represented by Expression (22) is derived from Expressions (19) to (21). A function indicating the ideal scanning position represented by the broken line after the coordinate transformation is represented by y'=fs'(n) ((3) of FIG. 10D).

$$yt=fs'(ns)=ft'(nt)=ft'(ft^{-1}(ys))=ft'(ft^{-1}(fs(ns)))$$

"ns" is generalized into "n" to obtain Expression (22).

$$fs'(n)=ft'(ft^{-1}(fs(n))) \quad \text{Expression (22)}$$

Further, Expression (18) and Expression (16) in which the pixel interval of the input image data and the interval of the scanning positions after the coordinate transformation are set to be uniform, with the distance of 1, are substituted into Expression (22). Then, Expression (22) is represented by Expression (23) with use of the inverse function ft$^{-1}$(n) of the function ft(n) for deriving the scanning position from the pixel number "n".

$$fs'(n)=ft^{-1}(n) \quad \text{Expression (23)}$$

Expression (9) in which the scanning positions are shifted uniformly in the advance direction and the return direction as illustrated in FIG. 9A and FIG. 9B, and Expression (12) for determining a position after the coordinate transformation of the input image data also have an inverse function relationship, and it can be confirmed that Expression (23) holds. Further, when applied to the case in which the dense or sparse state occurs in scanning positions as illustrated in FIG. 11A and FIG. 11B, the function "y" representing scanning positions before the coordinate transformation is represented by Expression (24) when the function "y" is a straight line with a gradient "k", passing through (n0, y0).

$$fs(n)=y=k\times(n-n0)+y0 \quad \text{Expression (24)}$$

In order to determine a pixel position after the coordinate transformation of the y-axis of the input image data, it is only necessary that an inverse function ((1/k)×(y−y0)+n0) be determined by Expressions (22) and (23), and the pixel number "n" be substituted into the inverse function, and hence Expression (25) is derived.

$$y'=(1/k)\times(n-y0)+n0 \quad \text{Expression (25)}$$

Figure 11A:
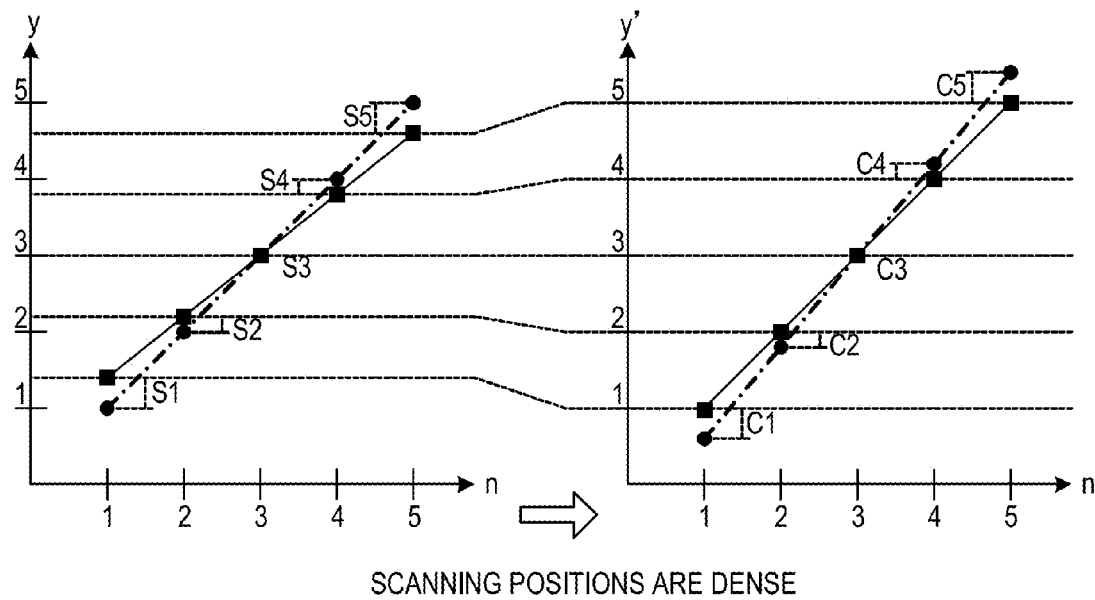
FIG. 11A and FIG. 11B are each a graph for showing coordinate transformation of pixel positions in the sub-scanning direction according to the first and second embodiments.
Figure 11B:
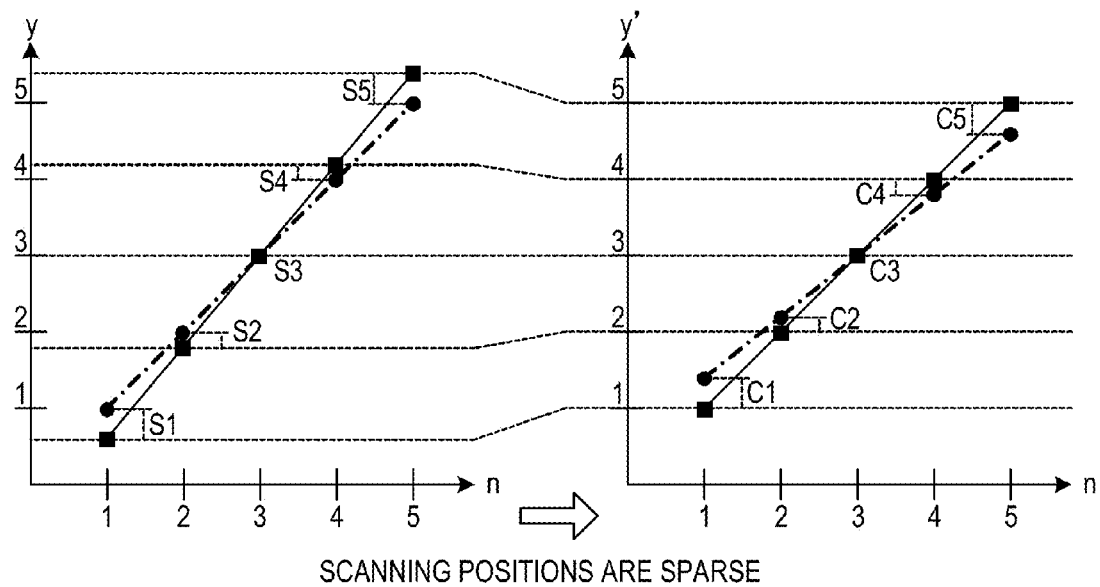

When the scanning lines illustrated in FIG. 11A are dense, and the scanning lines illustrated in FIG. 11B are sparse, the positions of the scanning lines on the photosensitive drum 102 after the coordinate transformation can be represented by Expression (25) in both the cases. Further, a correction value Cn of the pixel number n is determined by Cn=fs'(n)−fs(n).

Specifically in FIG. 11A, n0=y0=3 and k=0.8 are satisfied, and Expression (26) is obtained.

$$fs'(n)=(1/0.8)\times(n-3)+3 \quad \text{Expression (26)}$$

For example, in the pixel number 3, fs'(3)=3.00 is satisfied, and the correction value C3 is 0.00 (=3.00−3.00). Further, in the pixel number 5, fs'(5)=5.50 is satisfied, and the correction value C5 is +0.50 (=+5.50−5.00). The correction values C1 to C5 when the scanning positions are dense are illustrated in FIG. 13C.

Further, in FIG. 11B, n0=y0=3, and k=1.2 are satisfied, and Expression (27) is obtained.

$$fs'(n)=(1/1.2)\times(n-3)+3 \quad \text{Expression (27)}$$

For example, in the pixel number 3, fs'(3)=3.000 is satisfied, and the correction value C3 is 0.000 (=3.000−3.000). Further, in the pixel number 5, fs'(5)=4.667 is satisfied, and the correction value C5 is −0.333 (=4.667−5.000). The correction values C1 to C5 when the scanning positions are sparse are illustrated in FIG. 13D.

Further, even when a dense or sparse state and a shift are mixed in the scanning lines, an ideal scanning position after the coordinate transformation can be determined with use of Expression (22) or (23). The correction value setting portion 506 is configured to subject an ideal scanning position to the coordinate transformation based on a positional deviation amount to determine the correction value Cn, and output information on the correction value Cn to the filter coefficient setting portion 504.

(Filtering)

In the embodiment, the filtering is performed in order to generate correction data. In the embodiment, the filtering portion 501 is configured to perform the filtering through a convolution operation based on the following filter function. That is, the filtering portion 501 performs the filtering based on a positional relationship between the pixel positions in the sub-scanning direction of pixels obtained by correcting scanning positions in the sub-scanning direction of pixels of the input image data, and the sub-scanning positions of pixels having an interval between scanning lines transformed uniformly by the coordinate transformation. A pixel before the filtering is also referred to as an input pixel, and a pixel after the filtering is also referred to as an output pixel. Further, a pixel before the filtering is a pixel subjected to the above-mentioned coordinate transformation.

Figure 12A:
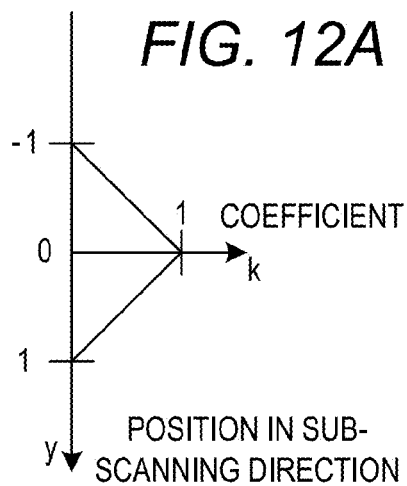
FIG. 12A, FIG. 12B, and FIG. 12C are each a graph for showing a convolution function to be used in filtering according to the first and second embodiments.
Figure 12B:
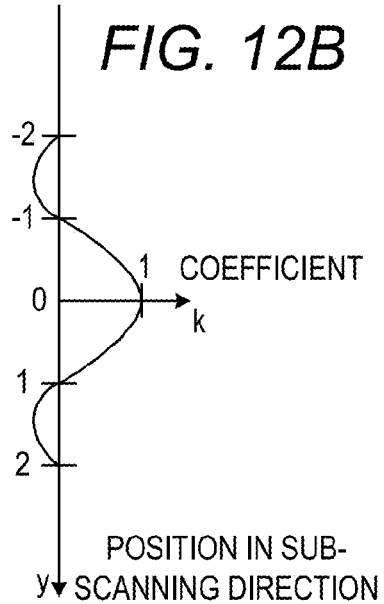
Figure 12C:
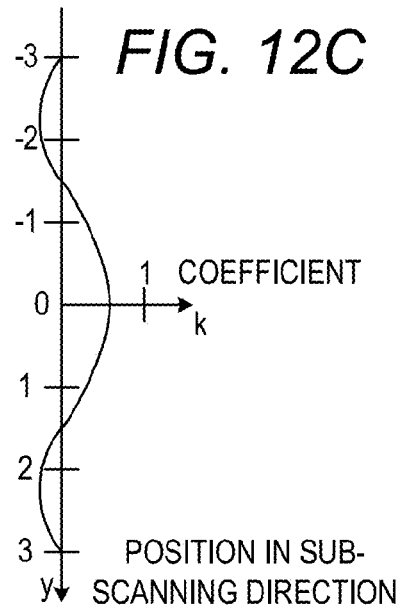

The convolution function according to the embodiment can be selected from linear interpolation illustrated in FIG. 12A, and bicubic interpolation illustrated in FIG. 12B and FIG. 12C. The filter function output portion 505 outputs information on the convolution function used in the filtering to the filter coefficient setting portion 504 as information of the table, for example. In FIG. 12A, 12B, and FIG. 12C, a vertical axis "y" represents a position in the sub-scanning direction, with a unit being a pixel, and a horizontal axis represents a magnitude of a coefficient. Although the unit of the vertical axis "y" is set to a pixel, a line may be used as a unit because the sub-scanning direction is illustrated.

An expression of FIG. 12A is represented by Expression (28).

$$k=y+1 \quad (-1\leq y\leq 0)$$

$$k=-y+1 \quad (0<y\leq 1)$$

$$0 \quad (y<-1, y>1) \quad \text{Expression (28)}$$

Expressions of FIG. 12B and FIG. 12C are represented by the following two expressions.

$$\text{bicubic}(t) = \begin{cases} (a+2)|t|^3 - (a+3)|t|^2 + 1 & (|t| \le 1) \\ a|t|^3 - 5a|t|^2 - 8a|t| - 4a & (1 < |t| \le 2) \\ 0 & (2 < |t|) \end{cases} \quad \text{Expression (29)}$$

$$k = \text{bicubic}\left(\frac{y}{w}\right) / w \quad \text{Expression (30)}$$

In the embodiment, "a" is set to −1, and "w" is set to 1 in FIG. 12B and set to 1.5 in FIG. 12C, but "a" and "w" may be adjusted in accordance with the electrophotographic characteristics of each image forming apparatus. The filter coefficient setting portion 504 is configured to output a coefficient ("k" described later) to be used in the filtering to the filtering portion 501 based on the information on the filter function obtained from the filter function output portion 505 and the information on the correction value C output from the correction value setting portion 506. In the embodiment, the correction value C is corrected in accordance with a developing voltage value as described later.

Figure 12D:
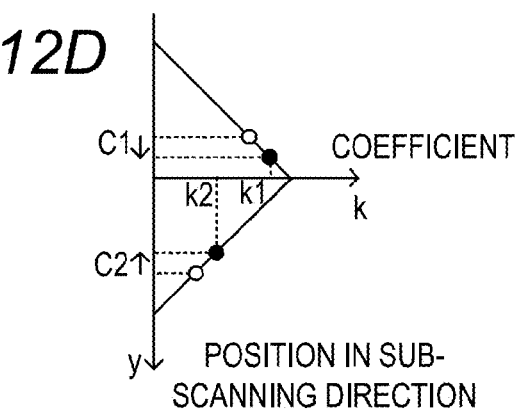
FIG. 12D is a graph for showing a correction value and a coefficient.

Now, the filtering will be described with reference to FIG. 12D. In FIG. 12D, a horizontal axis represents a coefficient "k" to be used in the filtering, and a vertical axis represents a position "y" in the sub-scanning direction. When the filter coefficient setting portion 504 receives the correction value Cn from the correction value setting portion 506, the filter coefficient setting portion 504 determines a coefficient "kn" corresponding to the correction value Cn with use of the filter function input from the filter function output portion 505. White circles of FIG. 12D represent coefficients before the coordinate transformation. Further, in FIG. 12D, it is illustrated that coefficients k1 and k2 were set with respect to a correction value C1 and a correction value C2, respectively, as coefficients "kn" to be used in the filtering (black circles). In the embodiment, the same convolution function is applied irrespective of whether the input image data is dense or sparse, and sampling is performed at an ideal scanning position, to thereby store density per predetermined area of the input image data.

(Specific Example of Filtering)

A specific example of performing the filtering with use of the convolution operation with a filter function by linear interpolation of Expression (28) based on a coordinate position after the coordinate transformation of the embodiment will be described with reference to FIG. 13A, FIG. 13B, FIG. 13C, and FIG. 13D. The filtering using the convolution operation is performed by the filtering portion 501. FIG. 13A to FIG. 13D correspond to FIG. 8A to FIG. 8D. Each column on the left side of FIG. 13A to FIG. 13D represents input pixels after the above-mentioned coordinate transformation. Further, each column on the right side of FIG. 13A to FIG. 13D represents scanning positions on the photosensitive drum 102 after the above-mentioned coordinate transformation. That is, the scanning positions in each column on the right side of FIG. 13A and FIG. 13D have been subjected to the coordinate transformation so as to have a uniform interval and a distance of 1.

More specifically, the scanning positions in the sub-scanning direction of input pixels after the coordinate transformation are represented by a straight line (y'=fs'(n)) indicated by the alternate long and short dash line of the graph after the coordinate transformation illustrated on the right side of FIG. 9A, FIG. 9B, FIG. 11A, and FIG. 11B. The scanning positions on the photosensitive drum 102 after the coordinate transformation are represented by a straight line (y'=fs'(n)) indicated by the solid line of the graph after the coordinate transformation illustrated on the right side of FIG. 9A, FIG. 9B, FIG. 11A, and FIG. 11B. For example, in FIG. 9A, the shift amount is +0.2 (=S), and hence fs'(n)=y−0.2=n−0.2 is satisfied after the coordinate transformation.

Further, in FIG. 13A, FIG. 13B, FIG. 13C, and FIG. 13D, the magnitude of a pixel value, that is, a density value is represented by shading of circles. Further, numbers in parentheses indicate numbers of scanning lines, and are the same as the pixel numbers illustrated in FIG. 8A to FIG. 8D. In each graph at the center of FIG. 13A, FIG. 13B, FIG. 13C, and FIG. 13D, a horizontal axis represents density, and a vertical axis represents a position in the sub-scanning direction. The convolution operation involves developing waveforms W (W1 to W5 with respect to the pixels (1) to (5)) obtained by multiplying the filter function based on each coordinate position of an input image (FIG. 12A) by a pixel value, and adding the waveforms W by superimposing.

Figure 13A:
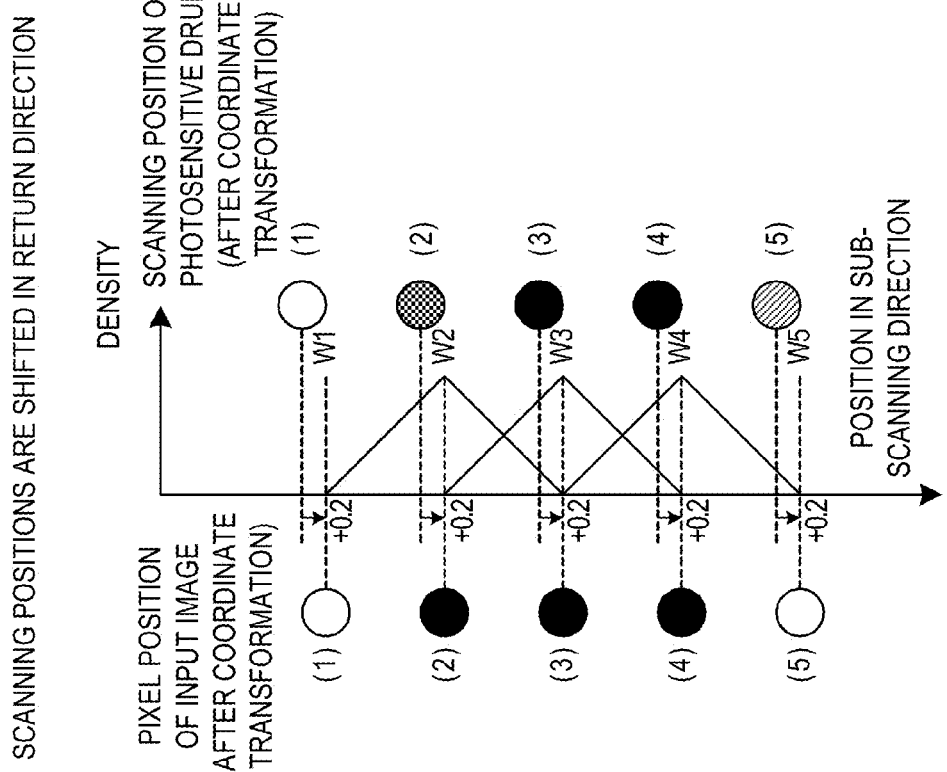
FIG. 13A, FIG. 13B, FIG. 13C, and FIG. 13D are each a diagram for illustrating the filtering for each classification of positional deviation according to the first and second embodiments.

FIG. 13A will be described first. The pixels (1) and (5) represented by white circles have a density of 0, that is, a pixel value of 0. Therefore, W1 and W5 obtained by multiplying a filter function by a pixel value are both 0. The pixels (2), (3), and (4) represented by black circles have the same density, and the maximum values of the waveforms W2, W3, and W4 are the same. Thus, the pixels (2), (3), and (4) each result in a waveform obtained by developing the filter function based on the pixel position of the input pixel. The result of the convolution operation is a sum (ΣWn, n=1 to 5) of all the waveforms.

Figure 13B:
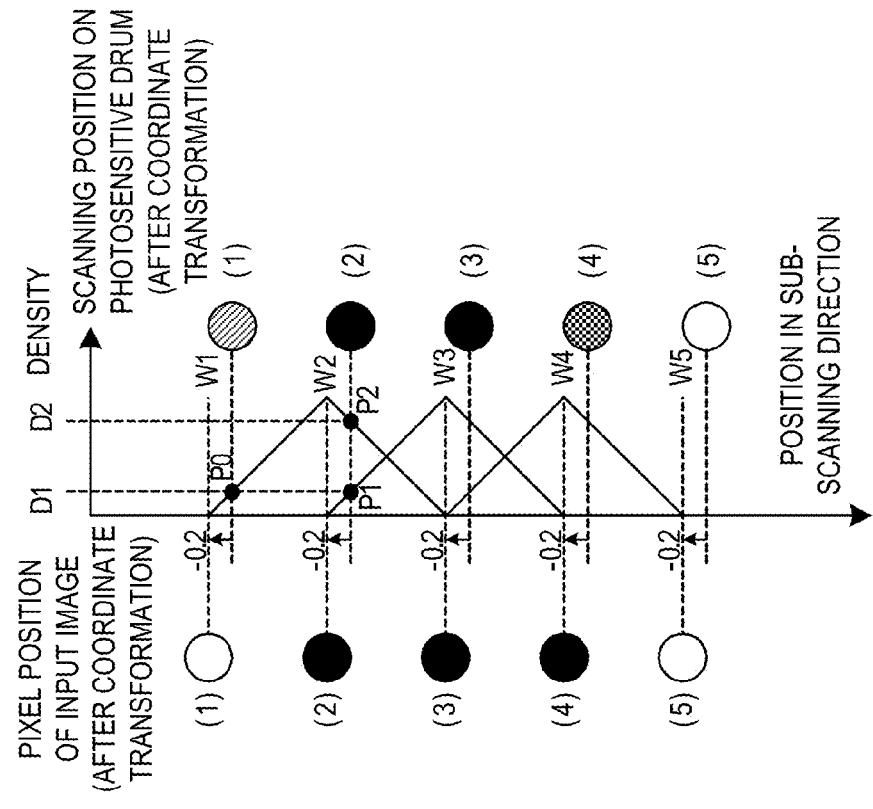
Figure 13C:
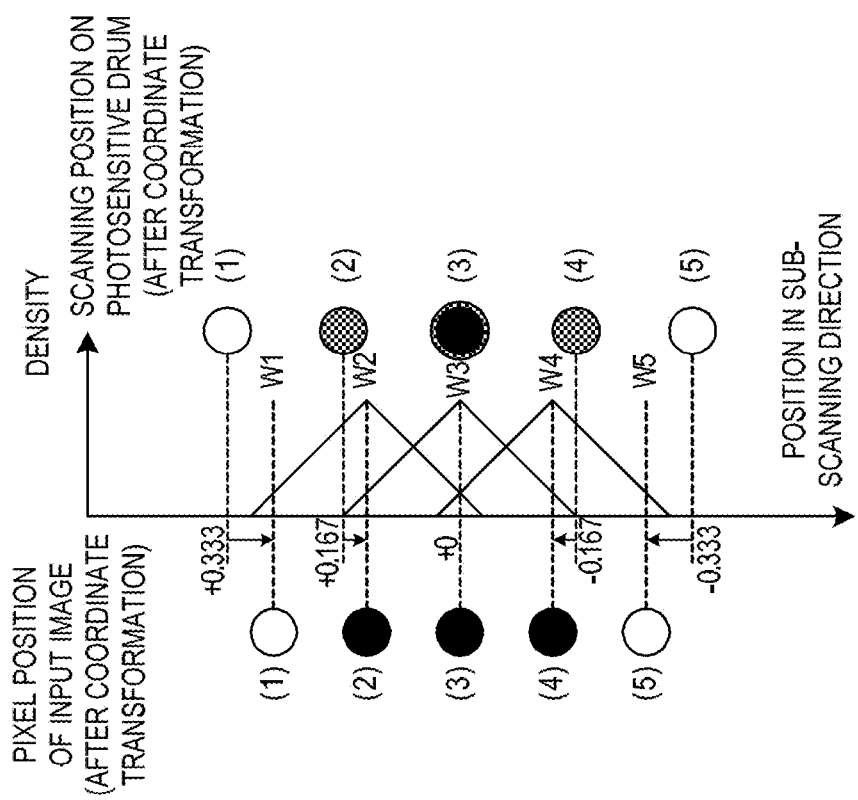
Figure 13D:
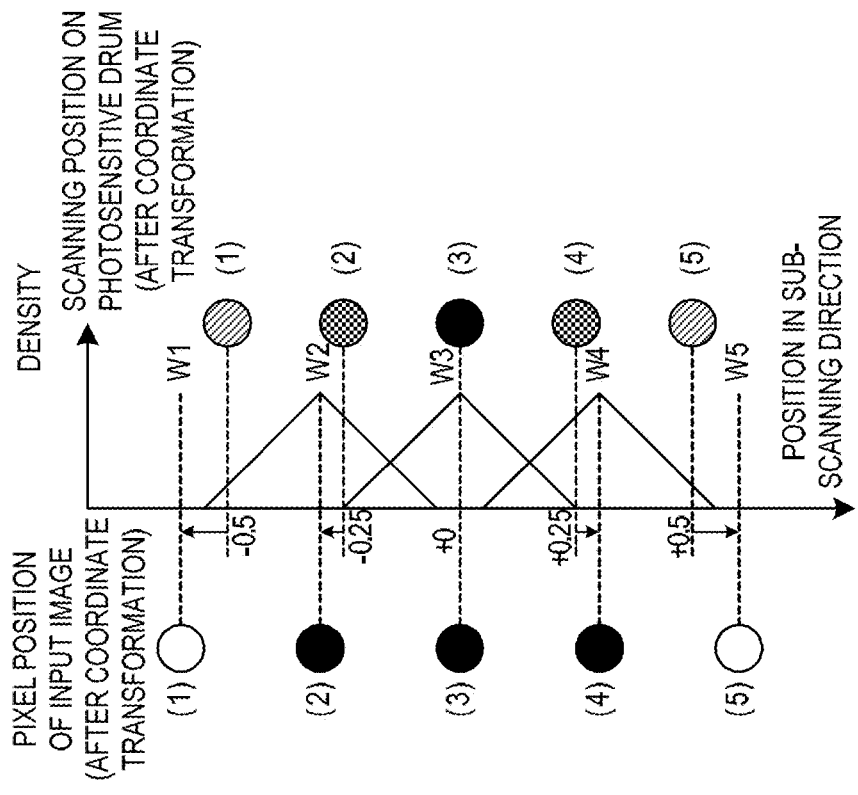

A pixel value of an output pixel is sampled at the scanning position on the photosensitive drum 102 after the scanning position is subjected to the coordinate transformation. Therefore, for example, the pixel value (1) corresponding to the scanning position on the photosensitive drum 102 intersects with the waveform W2 at a point P0, and hence is calculated to be density D1. Further, the pixel value (2) intersects with the waveform W2 at a point P2 and the waveform W3 at a point P1, respectively, and hence is calculated to be density D1+D2. The pixel values (3) to (5) are subsequently determined in a similar manner. The pixel value (5) does not intersect with any waveform, and hence the pixel value thereof is set to 0. Further, the result obtained by calculating the pixel values (1) to (5) of FIG. 13B to FIG. 13D are represented by shading of pixels in each column on the right side.

The positional deviation of the input pixels is illustrated so as to correspond to each pixel in the vertical axis of FIG. 13A to FIG. 13D. The positional deviation amount represented by the vertical axis of FIG. 13A to FIG. 13D is information on the positional deviation amount determined by an inverse function in accordance with the coordinate transformation of the scanning positions in the sub-scanning direction of the pixels of the input image. For example, in the case of FIG. 13A, as described with reference to FIG. 9A, the correction amount C of the positional deviation amount S of the scanning lines is −0.2. Further, for example, in the cases of FIG. 13C and FIG. 13D, the correction amounts C are calculated with use of Expressions (26) and (27), respectively.

FIG. 13A is an illustration of a state in which the scanning positions of the scanning lines are shifted in the advance direction in the sub-scanning direction, but the gravity centers of the pixel values are shifted in the return direction, and hence the positions of the gravity centers of the pixel values are corrected. FIG. 13B is an illustration of a state in which the scanning positions of the scanning lines are shifted in the return direction in the sub-scanning direction, but the gravity centers of the pixel values are shifted in the advance direction, and hence the positions of the gravity centers of the pixel values are corrected. FIG. 13C is the case in which the scanning positions are dense, and is an illustration of a state in which the distribution of density is widened due to the convolution operation after the coordinate transformation to cancel the local concentration of density, to thereby correct a local change in density. Further, FIG. 13D is the case in which the scanning positions are sparse, and is an illustration of a state in which the distribution of density is narrowed due to the convolution operation after the coordinate transformation to cancel the dispersion of density, to thereby correct a local change in density. In particular, the pixel value (3) of FIG. 13D is a density of (100+α) % that is higher than 100%.

(Filtering)

Referring back to FIG. 7, in Step S3605, the CPU 303 selects and reads, from a correction table shown in Table 2, a position correction coefficient h1 and a light intensity correction coefficient h2 corresponding to the setting value of the developing voltage read in Step S3603 described above. The CPU 303 is configured to store the correction table shown in Table 2 in an internal storage portion (not shown) of the CPU 303.

TABLE 2

| Developing Voltage | Position Correction Coefficient h1 | Light Intensity Correction Coefficient h2 |
|---|---|---|
| −500 V | 0.9 | 0.9 |
| −450 V | 1 | 1 |
| −400 V | 1.1 | 1.1 |
| −350 V | 1.2 | 1.2 |

Table 2 is an example of a correction table regarding the setting value of the developing voltage. In Table 2, the left column represents the developing voltage value of a developing voltage applied by the developing device 105, and the center column represents the position correction coefficient h1 for correcting a position correction amount (deviation amount of a scanning line) in accordance with the developing voltage value. Further, the right column of Table 2 represents the light intensity correction coefficient h2 for correcting image data indicating image density in accordance with the developing voltage value. The developing voltage value is held within a range of from −350 V to −500 V in a unit of 50 V (volts), but the developing voltage value may be held in a smaller developing voltage unit in Table 2. Further, in the embodiment, the above-mentioned developing threshold value Th is set to a light intensity (exposure amount) at a time when the developing voltage is −450 V. Therefore, in Table 2, when the developing voltage is −450 V, coefficients (h1=1, h2=1), at which the position correction and the light intensity correction are not performed, are set. Meanwhile, when the developing voltage is not −450 V, correction is made with the position correction coefficient h1 and the light intensity correction coefficient h2 shown in Table 2, and the position correction amount that is a deviation amount of a scanning line and the pixel value (pixel data) that is a density value of a pixel are adjusted.

The CPU 303 is configured to obtain the position correction coefficient h1 and the light intensity correction coefficient h2 corresponding to the current developing voltage value from Table 2 and corrects (adjusts) the position correction amount and the image data by Expressions (31) and (32).

Position correction amount'=Position correction amount×Position correction coefficient $h1$ Expression (31)

Image data'=Image data×Light intensity correction coefficient $h2$ Expression (32)

The position correction amount of Expression (31) refers to the above-mentioned correction amount C, and the image data of Expression (32) refers to the image density of a pixel.

In Step S3606, the CPU 303 performs the filtering with the filtering portion 501 based on attribute information for correction (position correction amount, position correction amount' after adjustment of image data, image data') generated in Step S3605. More specifically, the CPU 303 performs the above-mentioned convolution operation and re-sampling (correction of image data of an output image) for the input image. As described above, in the embodiment, the CPU 303 corrects the position correction amount and the image data in accordance with the developing voltage value.

In the embodiment, when the setting value of the developing voltage (absolute value) becomes larger (e.g., −500 V) than −450 V (voltage at which the developing threshold value Th is obtained), the developing threshold value Th decreases. In contrast, when the setting value of the developing voltage (absolute value) becomes smaller (e.g., −400 V, −350 V) than −450 V, the developing threshold value Th increases. When the developing threshold value Th decreases, development is performed through adhesion of a toner even when the light intensity is small, and hence the image density increases, with the result that the gravity center movement amount in the case of an image shift becomes larger. Therefore, as the developing voltage increases (e.g., −500 V), the position correction coefficient h1 and the light intensity correction coefficient h2 are set to be smaller than 1 so that the image density is decreased, and the gravity center movement amount in the case of an image shift becomes smaller.

Meanwhile, when the developing threshold value Th increases, a toner does not adhere unless the light intensity is increased, and hence the image density decreases, with the result that the gravity center movement amount in the case of an image shift becomes smaller. Therefore, as the developing voltage decreases (e.g., −350 V, −400 V), the position correction coefficient h1 and the light intensity correction coefficient h2 are set to be larger than 1 so that the image density is increased, and the gravity center movement amount in the case of an image shift becomes larger.

The position correction coefficient h1 and the light intensity correction coefficient h2 shown in Table 2 represent examples of values set based on the characteristics obtained through an experiment. For example, when the sensitivity characteristics are varied depending on the difference in developing method and material for the photosensitive drum, the values and magnitude relationship of the respective correction coefficients shown in Table 2 are also varied. Therefore, when the developing method and the material for the photosensitive drum are different, it is only necessary that a relationship of the image density and the gravity center movement amount be determined in advance for each image forming condition (e.g., developing voltage, charging voltage, and exposure light intensity), to thereby determine a correction coefficient.

As described above, when a position correction amount and image density for correcting banding are corrected based on the setting value of a developing voltage, banding can be corrected without causing uneven image density and the like even when a developing threshold value changes. In the above-mentioned embodiment, an example in which correction is made with use of a developing voltage value as the image forming condition will be described. For example, in an image forming apparatus in which a charging voltage and an exposure amount are adjusted so as to adjust image density, in the same way as in Table 2, a correction table corresponding to the charging voltage and the exposure amount may be provided so as to correct a position correction amount and image density in accordance with the charging voltage and the exposure amount. Thus, by switching a correction coefficient of banding correction in accordance with the image forming conditions, an image defect, e.g., an error of the gravity center movement amount of an image or a density change, which occurs due to a change in image forming condition, can be prevented.

Further, there is an image forming apparatus having a configuration in which the thermistor 401 is arranged in a main body, and the image forming conditions (developing voltage, charging voltage, and exposure amount) are controlled in accordance with the temperature detection results obtained by the thermistor 401. In the image forming apparatus having such configuration, the temperature detection information obtained by the thermistor 401 may be associated with the position correction coefficient information and the light intensity correction coefficient information and stored, and a position correction amount and image density may be corrected in accordance with the temperature detection results obtained by the thermistor 401.

Further, besides the linear interpolation and bicubic interpolation used as interpolation method of the embodiment, interpolation in which a window function of a desired size is applied to a Sinc function or interpolation involving determining a convolution function in accordance with intended filter characteristics may be performed. Further, the present invention can be applied to an image output method or an image output device in which an interval between output pixels or lines is distorted, irrespective of whether the method is an LED exposure method or an electrophotographic method. Further, in the embodiment, interpolation is performed by correcting a position of a pixel of an input image in accordance with Expressions (22) and (23), but functions approximate to Expressions (22) and (23) may be selected to be used for correction depending on the intended correction accuracy. Further, the configuration using the CPU 303 as the controller is described, but an application specific integrated circuit (ASIC), for example, may be used.

As described above, according to the embodiment, satisfactory image quality can be obtained by correcting distortion and uneven image density of an image in accordance with the image forming conditions.

Second Embodiment

In the first embodiment, a method involving correcting a gravity center movement amount in the case of an image shift and image density in accordance with a developing voltage will be described. In the second embodiment, a method involving detecting a change in developing threshold value with the density sensor 602 arranged in the image forming apparatus 100 and correcting a gravity center movement amount in the case of an image shift and image density in accordance with the developing threshold value will be described. The configurations of the image forming apparatus 100 and the light scanning device 104 are the same as those of the first embodiment. Therefore, those configurations are denoted by the same reference symbols, and the description thereof is omitted.

<Density Sensor>

Figure 14A:
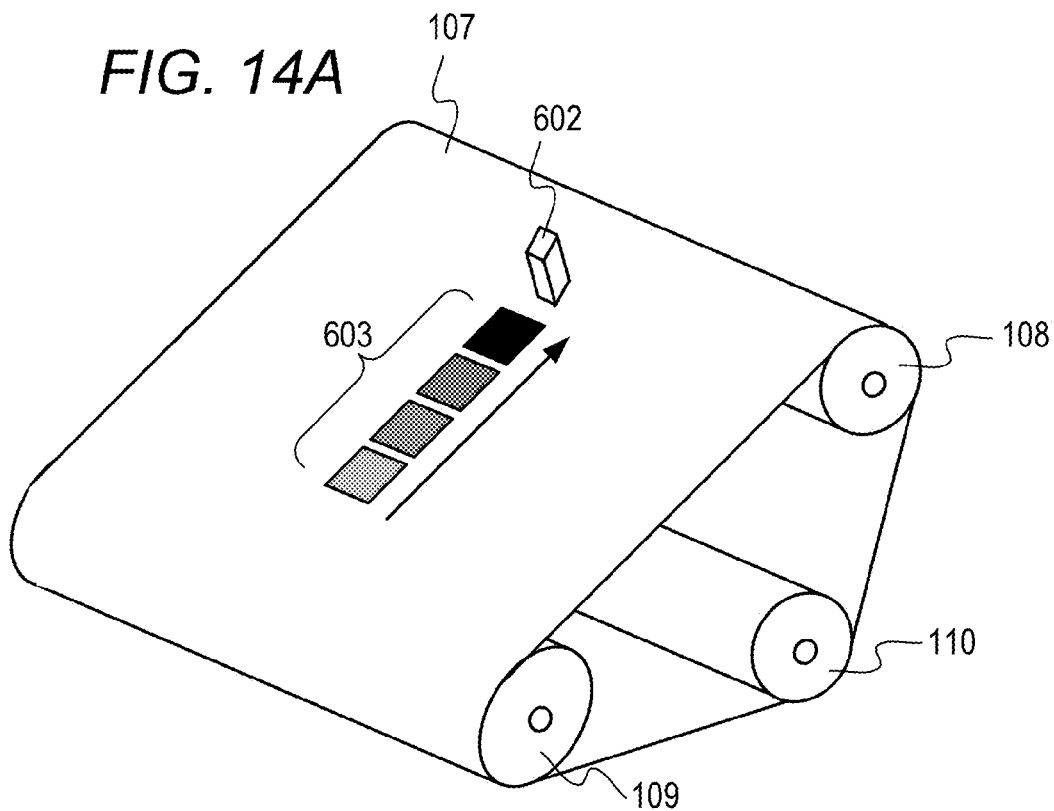
FIG. 14A is a view for illustrating a patch density detection configuration according to the first and second embodiments.

FIG. 14A is a schematic view for illustrating a positional relationship of the density sensor 602. The density sensor 602 is installed in an upper portion at a position opposed to a center portion of the intermediate transfer belt 107 in a direction orthogonal to the rotational direction. The density sensor 602 is configured to detect density of a density detection patch 603 formed in the center portion of the intermediate transfer belt 107 and output the detected density value of the density detection patch 603 to the CPU 303.

<Relationship Between Exposure Light Intensity and Image Density>

Figure 14B:
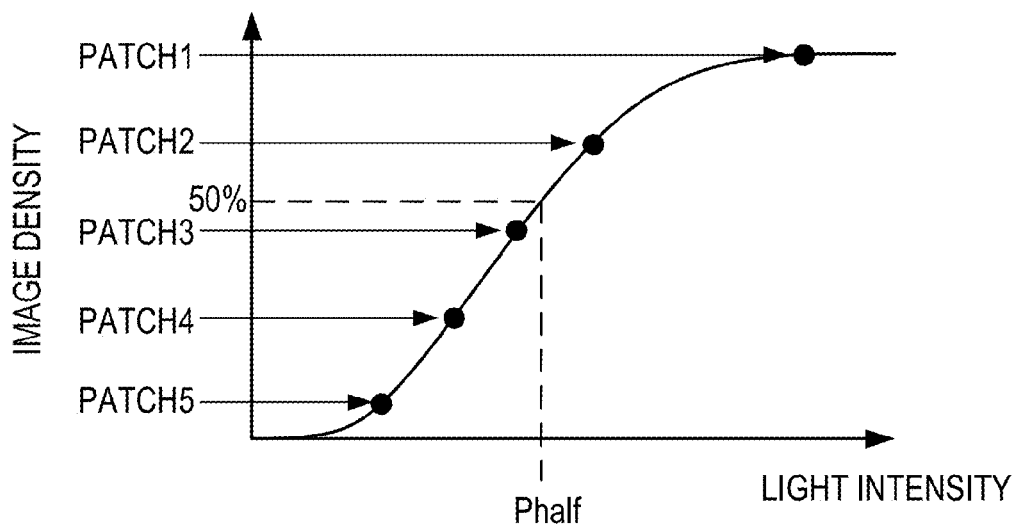
FIG. 14B is a graph for showing patch density detection results according to the second embodiment.

In the embodiment, the CPU 303 is configured to form a plurality of patch images on the intermediate transfer belt 107 with the light scanning device 104 with a change in exposure amount of the light scanning device 104 and detect density values of the patch images with the density sensor 602. FIG. 14B is a graph for showing a characteristic curve representing the relationship between the exposure amount in which the light scanning device 104 exposes the photosensitive drum 102 with light and the image density of the patch images (patches 1 to 5) formed on the intermediate transfer belt 107. The vertical axis of FIG. 14B represents image density, and the horizontal axis represents light intensity (exposure amount). FIG. 14B is a graph for showing detection results obtained by forming patch images (patches 1 to 5) with the light scanning device 104 with a change in exposure amount of the light scanning device 104 in five stages and detecting image density of each patch image with the density sensor 602. The CPU 303 is configured to interpolate the relationship between the density value of each patch and the exposure amount and determine an exposure amount Phalf in which the image density of a patch to be formed becomes 50% with respect to the patch 1 having an image density of 100% (largest). In this case, the exposure amount Phalf in which the image density becomes 50% refers to an exposure amount at a time of forming an image having intermediate density between solid black (patch 1 of FIG. 14B) in which a toner is in the thickest state and solid white in which a toner is not present (toner non-adhesion state). In the embodiment, in the exposure amount Phalf in which the intermediate density is obtained, an exposure amount Phalf corresponding to 50% of the exposure amount at a time of forming the patch 1 (solid black patch) having an image density of 100% is defined as the developing threshold value Th. A correction table containing information, in which the position correction coefficient h1 and the light intensity correction coefficient h2 are associated with each exposure amount Phalf, is stored in the internal storage portion (not shown) of the CPU 303. Table 3 is an example of such correction table.

TABLE 3

| Phalf | Position Correction Coefficient h1 | Light Intensity Correction Coefficient h2 |
|---|---|---|
| 30% | 1.2 | 1.2 |
| 40% | 1.1 | 1.1 |
| 50% | 1 | 1 |
| 60% | 0.9 | 0.9 |
| 70% | 0.8 | 0.8 |

In Table 3, the left column represents a numerical value indicating, in terms of percent, the exposure amount Phalf corresponding to 50% of the image density when the exposure amount at a time of forming the patch 1 (solid black patch) is defined as 100%. Further, the center column of Table 3 represents the position correction coefficient h1 corresponding to each exposure amount, and the right column of Table 3 represents the light intensity correction coefficient h2 corresponding to each exposure amount. The exposure amount is held within a range of from 30% to 70% in increments of tens percent (10%), but the exposure amount may be held in a smaller unit (e.g., 5%) in Table 3. Further, in Table 3, the light intensity at a time when the exposure amount Phalf is 50% is defined as the developing threshold value Th, and hence coefficients (h1=1, h2=1), at which the position correction and the light intensity correction are not performed, are set. Meanwhile, when the exposure amount Phalf is not 50%, the position correction coefficient h1 and the light intensity correction coefficient h2 for performing the position correction and the density correction in accordance with an exposure amount are set.

In the embodiment, the exposure amount which is 50% of the exposure amount at a time of forming a solid black patch is defined as the developing threshold value Th. Therefore, when the exposure amount Phalf becomes smaller (e.g., 30%, 40%) than the developing threshold value Th, the developing threshold value Th increases. Therefore, the adhesion of a toner does not occur easily, and image density decreases. In view of the foregoing, the position correction coefficient h1 and the light intensity correction coefficient h2 are set to be larger than 1 so that the image density is increased, and the gravity center movement amount in the case of an image shift becomes larger. Meanwhile, when the exposure amount Phalf becomes larger (e.g., 60%, 70%) than the developing threshold value Th, the developing threshold value Th decreases, and hence a larger amount of toner can be adhered easily, and the image density is increased. Therefore, the position correction coefficient h1 and the light intensity correction coefficient h2 are set to be smaller than 1 so that the image density is decreased, and the gravity center movement amount in the case of an image shift becomes smaller.

Also in the embodiment, the CPU 303 is configured to correct an image position and image data by reading the processing of the flowchart of FIG. 7 described in the first embodiment as described below. That is, in the embodiment, in Step S3603, the CPU 303 reads the exposure amount Phalf in which the image density becomes 50%, which is determined from the density value of a patch image detected by the density sensor 602, instead of reading the developing voltage setting value. Further, in Step S3605, the CPU 303 selects and obtains the position correction coefficient h1 and the light intensity correction coefficient h2 corresponding to the exposure amount Phalf from Table 3 and calculates a position correction amount' and image data' by Expressions (31) and (32). A series of operations of forming patches and detecting the density of the formed patches is controlled for execution timing by the CPU 303 and are executed, for example, at timing before image formation, such as timing immediately after the image forming apparatus 100 is turned on. Then, the exposure amount Phalf determined at this time, in which the image density becomes 50%, is stored in the internal storage portion (not shown) of the CPU 303.

In the embodiment, there is described a method involving detecting the exposure amount Phalf in which the image density becomes 50%, to thereby predict a difference in exposure amount from the developing threshold value Th, and correcting the position correction amount and the image data. Detection of the image density of a plurality of patch images obtained with a change in exposure amount enables prediction of a difference in exposure amount from the developing threshold value Th with higher accuracy. As a result, the image position and the image density can be corrected with high accuracy. In the embodiment, the exposure amount Phalf that is 50% of the exposure amount at a time of forming a solid black patch is closest to the developing threshold value Th, and hence the position correction coefficient h1 and the light intensity correction coefficient h2 are determined in accordance with the exposure amount Phalf. For example, a level different from the density of 50% may be set to be the developing threshold value Th depending on the developing characteristics of the image forming apparatus.

As described above, according to the embodiment, satisfactory image quality can be obtained by correcting uneven image density of an image caused in a direction corresponding to the rotational direction of the photosensitive member in accordance with the image forming conditions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-141774, filed Jul. 16, 2015, which is hereby incorporated by reference herein in its entirety.

What is claimed is:

1. A correction method for an image forming apparatus, the image forming apparatus comprising:
    a light source comprising a plurality of light emitting points;
    a photosensitive member configured to rotate in a first direction so that a latent image is formed on the photosensitive member with a light beam emitted from the light source; and
    a deflecting unit configured to deflect the light beam emitted from the light source to move light spots of the light beam radiated to the photosensitive member in a second direction orthogonal to the first direction to form scanning lines,
    the correction method comprising a correction step of correcting sparseness and denseness of density in the first direction, the sparseness and denseness of density in the first direction having been caused by deviation of the scanning lines in the first direction, by moving a pixel of interest in the first direction in accordance with the deviation of the scanning lines, and an output step of causing a pixel value of the pixel of interest to be output in accordance with a movement of the pixel of interest,
    wherein a correction amount of the pixel value of the pixel of interest differs in accordance with an image forming condition.

2. A correction method according to claim 1,
    wherein the image forming apparatus further comprises a developing device configured to develop the latent image on the photosensitive member to form a toner image,
    wherein the image forming condition comprises a developing voltage applied to the photosensitive member by the developing device, and
    wherein the correction amount of the pixel value of the pixel of interest when the developing voltage is higher than a predetermined voltage is adjusted so as to be smaller than the correction amount of the pixel value of the pixel of interest when the developing voltage is the predetermined voltage.

3. A correction method according to claim 1,
wherein the image forming apparatus further comprises a charging device configured to charge the photosensitive member with a uniform voltage,
wherein the image forming condition comprises a charging voltage with which the charging device charges the photosensitive member, and
wherein the deviation of the scanning lines and the correction amount of the pixel value of the pixel of interest are adjusted in accordance with the charging voltage.

4. A correction method according to claim 1,
wherein the image forming condition comprises a light intensity of the light beam emitted from the light source to the photosensitive member, and
wherein the deviation of the scanning lines and the correction amount of the pixel value of the pixel of interest are adjusted in accordance with the light intensity.

5. A correction method according to claim 1,
wherein the image forming apparatus further comprises a temperature detection unit configured to detect temperature of the image forming apparatus,
wherein the image forming condition comprises the temperature of the image forming apparatus, and
wherein the deviation of the scanning lines and the correction amount of the pixel value of the pixel of interest are adjusted in accordance with the temperature detected by the temperature detection unit.

6. A correction method according to claim 1,
wherein the image forming condition comprises a light intensity of the light beam emitted from the light source to the photosensitive member at a time when image density is predetermined density, and
wherein when the light intensity is larger than a predetermined light intensity, the deviation of the scanning lines and the correction amount of the pixel value of the pixel of interest are adjusted so as to be smaller than the deviation of the scanning lines and the correction amount of the pixel value of the pixel of interest at a time when the light intensity is the predetermined light intensity, and when the light intensity is smaller than the predetermined light intensity, the deviation of the scanning lines and the correction amount of the pixel value of the pixel of interest are adjusted so as to be larger than the deviation of the scanning lines and the correction amount of the pixel value of the pixel of interest at the time when the light intensity is the predetermined light intensity.

7. A correction method according to claim 6,
wherein the image forming apparatus further comprises a density detection unit configured to detect density of a patch image, and
wherein the light intensity of the light beam radiated to the photosensitive member so that the image density reaches the predetermined density is determined based on detection results of densities of patch images detected by the density detection unit, the patch images being formed through exposure with a plurality of different light intensities of the light beam.

8. A correction method according to claim 7, wherein the predetermined density comprises density corresponding to 50% when density of a solid black patch image detected by the density detection unit is defined to be 100%.

9. A correction method according to claim 8, wherein the predetermined light intensity comprises a light intensity corresponding to 50% when a light intensity of the light beam emitted from the light source to the photosensitive member in order to form the solid black patch image is defined to be 100%.

10. A correction method according to claim 1, wherein the correction step comprises:
a storing step of storing, in a storage unit, information on positional deviation of the scanning lines in the first direction;
a conversion step of converting positions of pixels of an input image by performing coordinate transformation based on the information stored in the storage unit so that an interval between the scanning lines on the photosensitive member becomes a predetermined interval;
an adjustment step of adjusting the positions of the pixels of the input image after the coordinate transformation and pixel values of the pixels of the input image in accordance with the image forming condition; and
a filtering step of determining pixel values of pixels of an output image by subjecting the pixel values of the pixels of the input image after the adjustment to a convolution operation based on the positions of the pixels of the input image after the adjustment.

11. A correction method according to claim 10, wherein the conversion step comprises determining the positions of the pixels of the input image after the coordinate transformation with use of an inverse function $ft^{-1}(n)$ of a function $ft(n)$ by the following expression:

$$fs'(n)=ft'(ft^{-1}(fs(n)))$$

where:
fs(n) represents a function indicating a position of an n-th pixel in the first direction of the input image;
ft(n) represents a function indicating a position of the n-th pixel in the first direction of the output image;
fs'(n) represents a function indicating a position of the n-th pixel in the first direction of the input image after the coordinate transformation; and
ft'(n) represents a function indicating a position of the n-th pixel in the first direction of the output image after the coordinate transformation.

12. A correction method according to claim 11, wherein the conversion step comprises determining, when the function fs(n) satisfies fs(n)=n and the function ft'(n) satisfies ft'(n)=n, the positions of the pixels of the input image after the coordinate transformation by the following expression:

$$fs'(n)=ft^{-1}(n).$$

13. A correction method according to claim 11, wherein the conversion step comprises interpolating, when the function fs(n) indicating the positions of the pixels of the input image or the function ft(n) indicating the positions of the pixels of the output image takes discrete values, the discrete values to obtain a continuous function.

14. A correction method according to claim 10, wherein the filtering step comprises performing the convolution operation with use of linear interpolation or bicubic interpolation.

15. A correction method according to claim 10,
wherein the pixel values comprise density values, and
wherein the filtering step comprises storing density values per predetermined area before and after performing the convolution operation.

16. A correction method according to claim 10,
wherein the image forming apparatus further comprises a speed detection unit configured to detect a rotation speed of the photosensitive member, and wherein the positional deviation in the first direction is corrected based on the rotation speed of the photosensitive member detected by the speed detection unit.

17. A correction method according to claim 10,
wherein the deflection unit comprises a rotary polygon mirror having a predetermined number of faces, and
wherein the information to be stored in the storage unit contains information on a variation in angle for each of the faces with respect to a rotary shaft of the rotary polygon mirror.

18. A correction method according to claim 10, wherein the predetermined interval is determined in accordance with a resolution of image formation by the image forming apparatus.

19. A correction method for an image forming apparatus comprising a light source including a plurality of light emitting points, a photosensitive member configured to rotate in a first direction so that a latent image is formed on the photosensitive member with a light beam emitted from the light source, a deflecting unit configured to deflect the light beam emitted from the light source to move light spots of the light beam radiated to the photosensitive member in a second direction orthogonal to the first direction to form scanning lines, and a developing device configured to develop the latent image on the photosensitive member to form a toner image, the correction method comprising:
   a correction step of correcting sparseness and denseness of density in the first direction, the sparseness and denseness of density in the first direction having been caused by deviation of the scanning lines in the first direction, by moving a predetermined pixel in the first direction in accordance with the deviation of the scanning lines, and
   an output step of causing a pixel value of the predetermined pixel to be output in accordance with a movement of the predetermined pixel,
wherein the correction step comprises correcting, based on the deviation of the scanning lines and the pixel value of the pixel, which are adjusted in accordance with an image forming condition, the sparseness and denseness of the density,
wherein the image forming condition comprises a developing voltage applied to the photosensitive member by the developing device, and
wherein when the developing voltage is higher than a predetermined voltage, the deviation of the scanning lines and the pixel value of the pixel are adjusted so as to be smaller than the deviation of the scanning lines and the pixel value of the pixel at a time when the developing voltage is the predetermined voltage, and when the developing voltage is lower than the predetermined voltage, the deviation of the scanning lines and the pixel value of the pixel are adjusted so as to be larger than the deviation of the scanning lines and the pixel value of the pixel at the time when the developing voltage is the predetermined voltage.

* * * * *